(12) United States Patent
O'Keeffe

(10) Patent No.: US 9,196,432 B1
(45) Date of Patent: Nov. 24, 2015

(54) SMART ELECTRICAL SWITCH WITH AUDIO CAPABILITY

(71) Applicant: James Thomas O'Keeffe, Newark, CA (US)

(72) Inventor: James Thomas O'Keeffe, Newark, CA (US)

(*) Notice: Subject to any disclaimer, the term of this patent is extended or adjusted under 35 U.S.C. 154(b) by 0 days.

(21) Appl. No.: 14/788,726

(22) Filed: Jun. 30, 2015

Related U.S. Application Data

(60) Provisional application No. 62/054,389, filed on Sep. 24, 2014.

(51) Int. Cl.
  *H04R 27/00* (2006.01)
  *H04R 1/02* (2006.01)
  *H01H 9/02* (2006.01)

(52) U.S. Cl.
  CPC .............. *H01H 9/0271* (2013.01); *H04R 1/028* (2013.01); *H01H 2239/048* (2013.01); *H04R 1/023* (2013.01); *H04R 27/00* (2013.01)

(58) Field of Classification Search
  CPC .......... H01H 9/0271; H01H 2239/048; H04R 1/028; H04R 1/025; H04R 1/023; H04R 27/00
  USPC ...................... 381/117, 82, 85, 391
  See application file for complete search history.

(56) References Cited

U.S. PATENT DOCUMENTS

| | | | |
|---|---|---|---|
| 3,927,402 A | 12/1975 | Thompson | |
| 4,012,602 A * | 3/1977 | Jackson | H04M 1/677 379/200 |
| 5,914,826 A * | 6/1999 | Smallwood | H01H 15/102 360/12 |
| 6,091,037 A | 7/2000 | Bachschmid | |
| 7,299,892 B2 | 11/2007 | Radu | |
| 7,608,948 B2 | 10/2009 | Nearhoof | |
| 8,666,104 B2 | 3/2014 | Ivey et al. | |
| 8,675,887 B2 | 3/2014 | Yuan et al. | |
| 2005/0237218 A1 | 10/2005 | Tang | |
| 2006/0161270 A1 | 7/2006 | Luskin | |
| 2007/0289860 A1 | 12/2007 | Newman | |
| 2011/0181201 A1 | 7/2011 | Hollis | |
| 2014/0270237 A1 | 9/2014 | Wang | |
| 2014/0270264 A1 | 9/2014 | Wang | |

* cited by examiner

Primary Examiner — Vivian Chin
Assistant Examiner — Douglas Suthers

(57) ABSTRACT

In one embodiment the present disclosure relates to providing wireless speaker functionality in an electrical switch assembly, such as a light switch located in the wall of a building. The switch assembly includes a faceplate with a touch-sensitive speaker grille covering a sizeable portion of the faceplate. The disclosed designs enables the grille portion of the faceplate to provide sound transmission and electrical switch control, thereby allows for a larger speaker to be placed centrally in the junction box, while maintaining full electrical switch functionality. In some embodiments illumination components (e.g. electroluminescent regions) are arranged on a circuit board with a plurality of openings designed to align with the grille. The illumination components can illuminate regions of the faceplate, indicating the current state of one or more electrical switches.

22 Claims, 18 Drawing Sheets

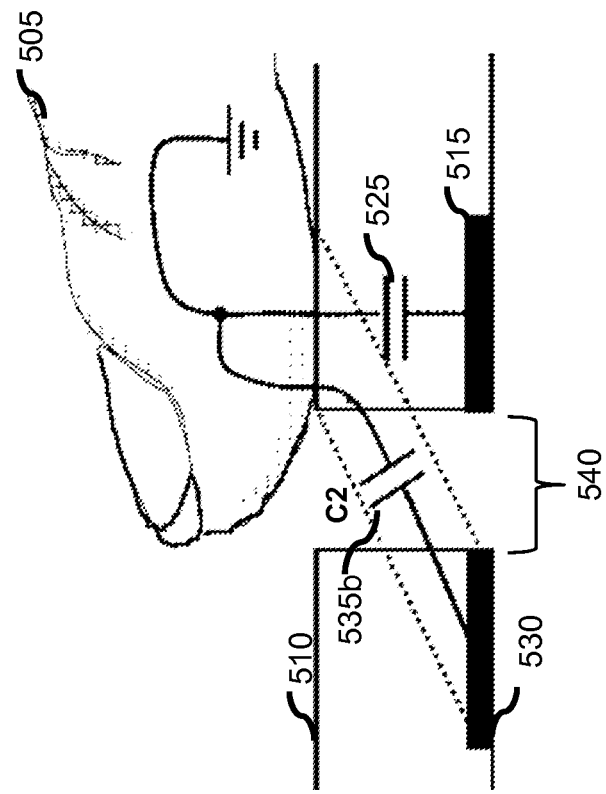
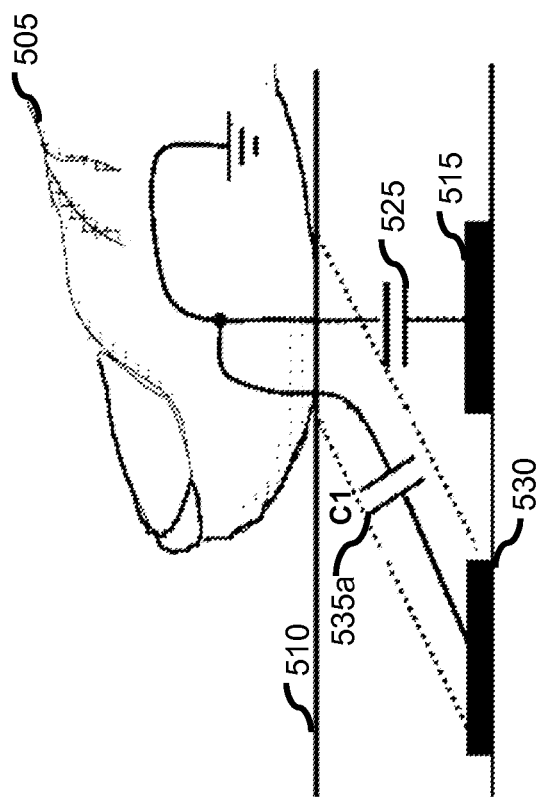
FIG. 5B
FIG. 5A

SMART ELECTRICAL SWITCH WITH AUDIO CAPABILITY

CROSS-REFERENCE TO RELATED APPLICATIONS

This application claims the benefit t of provisional patent application Ser. No. 62/054,389, filed on Sep. 24, 2014 by the present inventor.

BACKGROUND

The following is a tabulation of some prior art that presently appears relevant:

U.S. Patents

| Pat. No. | Kind Code | Issue Date | Patentee |
| --- | --- | --- | --- |
| 5,914,826 | A | 1999 Jun. 22 | Smallwood |
| 6,091,037 | A | 2000 Jul. 18 | Bachsehmid |
| 3,927,402 | A | 1975 Dec. 16 | Thompson |
| 8,675,887 | B2 | 2014 Mar. 18 | Yuan et al. |
| 8,666,104 | B2 | 2014 Mar. 04 | Ivey et al. |
| 7,608,948 | B2 | 2009 Oct. 27 | Nearhoof et al. |
| 7,299,892 | B2 | 2007 Nov. 27 | Radu et al |

U.S. patent application Publications

| Publication Nr. | Kind Code | Publ. Date | Applicant |
| --- | --- | --- | --- |
| 20050237218 | A1 | 2005 Oct. 27 | Tang et al. |
| 20140270237 | A1 | 2014 Sep. 18 | Wang et al |
| 20140270264 | A1 | 2014 Sep. 18 | Wang et at |
| 20110181201 | A1 | 2011 Jul. 28 | Hollis |
| 20070289860 | A1 | 2007 Dec. 20 | Newman et al. |
| 20060161270 | A1 | 2006 Jul. 20 | Luskin et al. |

TECHNICAL FIELD

The present disclosure relates generally to systems and methods for combining audio capability and user controls on the grille portion of a speaker. In particular the technology relates to a building-based electrical switch having an audio speaker, whereby a portion of the switch faceplate comprises a speaker grille speaker that provides means for both sound transmission and electrical switching.

BACKGROUND

The proliferation of consumer wireless electronics (e.g. smartphones, tablet PCs and laptops) has resulted in consumers increasingly carrying music collections with them. Speaker manufacturers have responded to this market trend by making smaller, more portable wireless speakers and wireless multi-room speakers (e.g., Bluetooth portable speakers and multi-room Wi-Fi speakers). As the form factor of wireless speakers shrinks, the area available for user input controls (e.g. Volume, Play, Pause) has also decreased. In a related area smart home electronics are becoming more popular. It would be advantageous to incorporate a speaker into new implementations of traditional devices (e.g. electrical switches, Thermostats and door locks). Providing adequate music-quality sound in a small enclosure is difficult, in part because speakers typically requires a large volume of space in a device enclosure. The space required to transmit sound form a speaker in a smart home device (e.g. a thermostat or light switch) competes for available space with the legacy control functions of traditional home control devices (e.g. electrical switches and Buttons and keypads, door-bells and light fixtures). For example the size and shape of household electrical junction boxes has remained largely unchanged since the 1940's. A building based, wall-mounted electrical switch (e.g. light switch) typically comprises of three parts: a junction box located on or within the wall, one or more switches mounted inside the junction box (e.g. paddle and button types) and a faceplate to cover the switches. The junction box has one or more bays to accommodate one or more switches. Each bay is approximately 2 inches wide and 4 inches high, therefore a 2-bay box would be 4 inches wide and could accommodate two standard light switches. When a house is constructed, the size of each junction box is typically selected to implement the lighting design. There are typically no unused or empty bays in junction boxes. This practice of "right-sizing" junction boxes is in part because unused bays must be covered for safety purposes and the presence of nonfunctioning extra bays with blank cover plates can be confusing to users. Recent trends in smart home appliances (e.g. wirelessly enabled lights and switches) make these prewired electrical junction boxes attractive location for new functionality. The practice of selecting the size of junction boxes to fit the original electrical requirements (e.g. lighting requirements and the need for switch-activated electrical outlets) is problematic to the task of adding additional functionality within junction boxes in existing homes. An ongoing challenge is how to increase the functionality within household electrical boxes while maintain the original functionality, which is often to provide electrical switching (e.g. light switches).

U.S. Pat. No. 5,914,826 disclose a speaker placed beside a light switch in a two-bay junction box. The speaker occupies one bay of the junction box. One disadvantages of this approach is that it reduces the functionality of the junction box by 1 switch. Another disadvantage is that this speaker-switch combination cannot be implemented in a single-bay junction box. U.S. Pat. No. 6,091,037 discloses a more compact speaker-switch combination but still requires a 2-bay junction box. Means of implementing these designs in a 1-bay box is not disclosed. This is an important limitation since the light switch in many rooms is located in a single-bay junction box. Importantly U.S. Pat. No. 7,608,948, U.S. Pat. No. 5,914,826 and U.S. Pat. No. 6,091,037 do not provide means to effectively combine the functions of sound transmission and electrical switching. In conclusion, insofar as I am aware, no electrical switch assembly previously disclosed has provided a built-in speaker while maintaining the functionality of all available switching bays in the junction box. Similarly, no electrical switch assembly has combined both a speaker and a lighting switch in a single-bay configuration. Similarly, no electrical switch assembly has provided a faceplate that effectively combines sound transmission and electrical switching.

SUMMARY

In one aspect of the present disclosure an interactive speaker faceplate with a touch sensitive grille area is disclosed. Methods to implement touch sensitivity on a speaker grille are provided while promoting effective sound transmission from a speaker behind the interactive grille.

In one embodiment a building-based electrical switch assembly (e.g. a light switch) in a wall-mounted junction box includes a speaker and an interactive speaker grille. The speaker grille has a several distinct touch-sensitive regions and fulfills the legacy functionality of one or more electrical switches. The design enables a bigger speaker to be centrally located in the junction box, for enhanced music quality, while maintaining all of the functionality of the electrical switch. The faceplate can be located similarly to a traditional light switch faceplate. The faceplate covers the transition from the wall to the junction box. The faceplate of the present system can also have a plurality of openings forming a speaker grille for the speaker. The openings extend over the center region of the faceplate to provide protection for the speaker cone behind, while allowing sound vibrations to be emitted from the speaker.

In some embodiments of this disclosure the faceplate and speaker grille are made from electrically insulating material and fulfills a design requirement to electrically insulating the user from high voltage wires and components associated with the electrical switch assembly. The speaker grille region provides the functionality of one or more electrical switches. Sensors disposed behind the speaker grille sense direct user interaction with several regions of the faceplate. Sensors signals are used to operate low voltage switches (e.g. touch sensitive switches). Low voltage switches can be combined with high voltage switches (e.g. relays and triacs) to implement the electrical switching functionality of a standard electrical switch, while much of the volume inside the electrical junction box is devoted to housing a speaker.

In one aspect of the disclosure, the grille section of the faceplate has a plurality of touch-sensitive regions enabled by touch sensors behind the front insulating faceplate. One or more of the touch sensors can also provide control over aspects of the speaker. In another aspect of the disclosure touch sensitive electrodes can be disposed on a substrate behind the grille, wherein the substrate has a plurality of opening that align with the grille, thereby providing touch sensitive functionality to the grille while maintaining the sound quality from the speaker and providing electrical insulation.

The disclosed designs enable the faceplate to act as both a grille for the speaker and as one or more electrical switches and thereby allows for a larger speaker to be placed centrally in the junction box, while maintaining full electrical switch functionality. This in turn allows the user to control the electrical switches and experience improved sound quality. In other embodiments illumination components are arranged on a circuit board with a plurality of openings aligning with the grille. The illumination components (e.g. electroluminescent regions) can light regions of the faceplate, indicating the current state of one or more electrical switches ((e.g. ON/OFF or degree of dimming). In this manner the speaker grille can act as an interactive control panel while not diminishing sound quality.

In some embodiments the speaker grille enables the system to detect when a person is proximal to the switch and activate an aspect of the speaker or switch. In one embodiment the speaker grille is an insulating material with conductive features deposited on the interior surface to enable person detection. In other embodiments elements deposited on the interior surface of the faceplate enable indication of the state of the switch. The techniques described in this specification can be implemented to achieve the following exemplary advantages:

Improved sound quality from an electrical switch by centrally locating a speaker where the switch typically resides. The system can be retrofitted in a building-based electrical junction box that is fully utilized without loss of any of the electrical load switching functionality. For example, previously a 2-bay junction box could accommodate a 2-inch wide speaker and a single 2-inch wide switch, thereby diminishing the functionality of the junction box by one switch while only allowing allow the speaker to occupy half of the junction box. With the present system both bays (4 inch by 4 inch) can be devoted to the speaker and the electrical switches can be implemented using the touch-sensitive speaker grille. The speaker can provide audio feedback when the switch is actuated, thereby providing the user with a familiar "click" sound associated with actuating a mechanical switch. The electrical switch with audio functionality can function as a wireless speaker for example a Bluetooth speaker offered to a hotel guest, while the location of the speaker is ensured by the placement of the speaker in the wall and power is supplied continuously from the electrical junction box.

A plurality of regions of the grille can illuminate in response to a user touching the faceplate and grille portion and can guide the user to correctly operate the switch or to indicate the current position of a switch or dimmer switch. Still further advantages will become apparent from a study of the following description and the accompanying drawings.

DRAWINGS

Figure 5C:
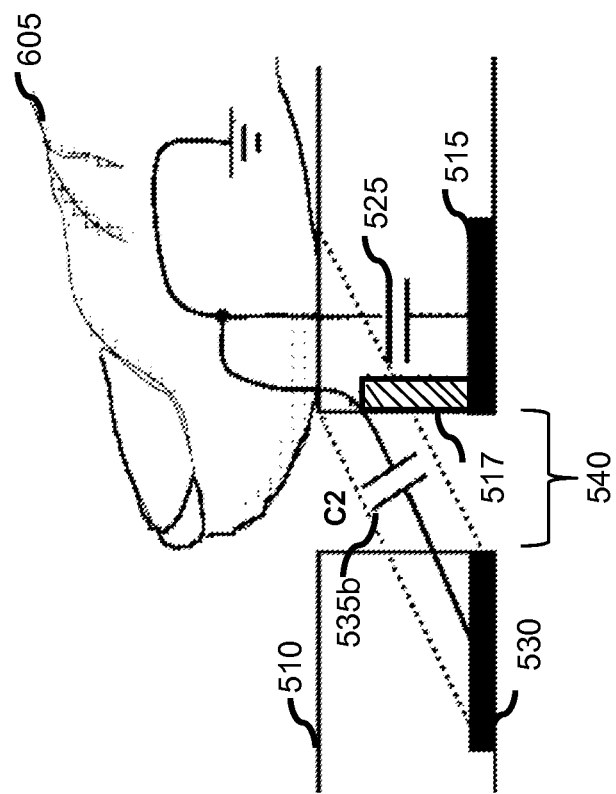

FIGS. 5A to 5C. illustrates a finger interacting with a target sensor electrode and a neighboring sensor electrode in accordance with one embodiment of the present technology.

Figure 6:
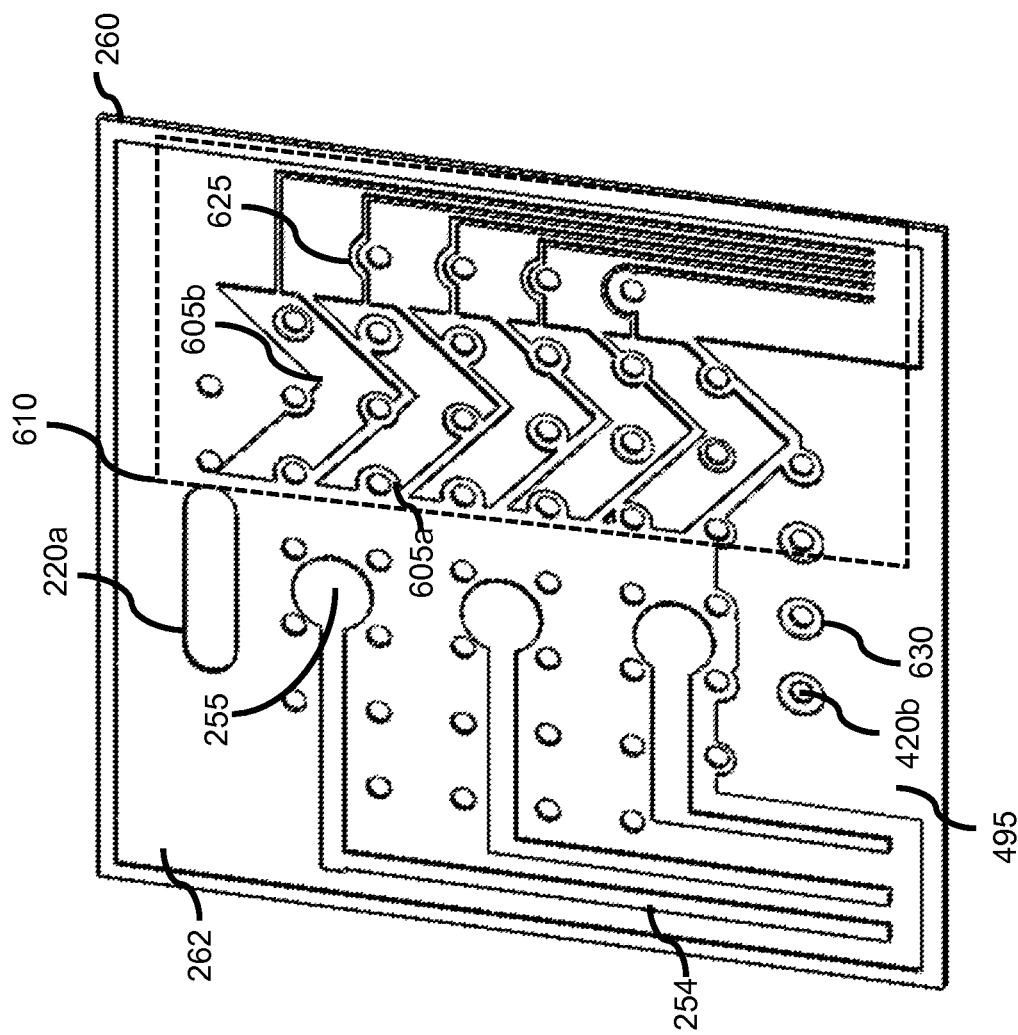

FIG. 6 illustrates an insulating electrical substrate with conductive electrodes designed in accordance with one embodiment of the present technology.

Figure 7:
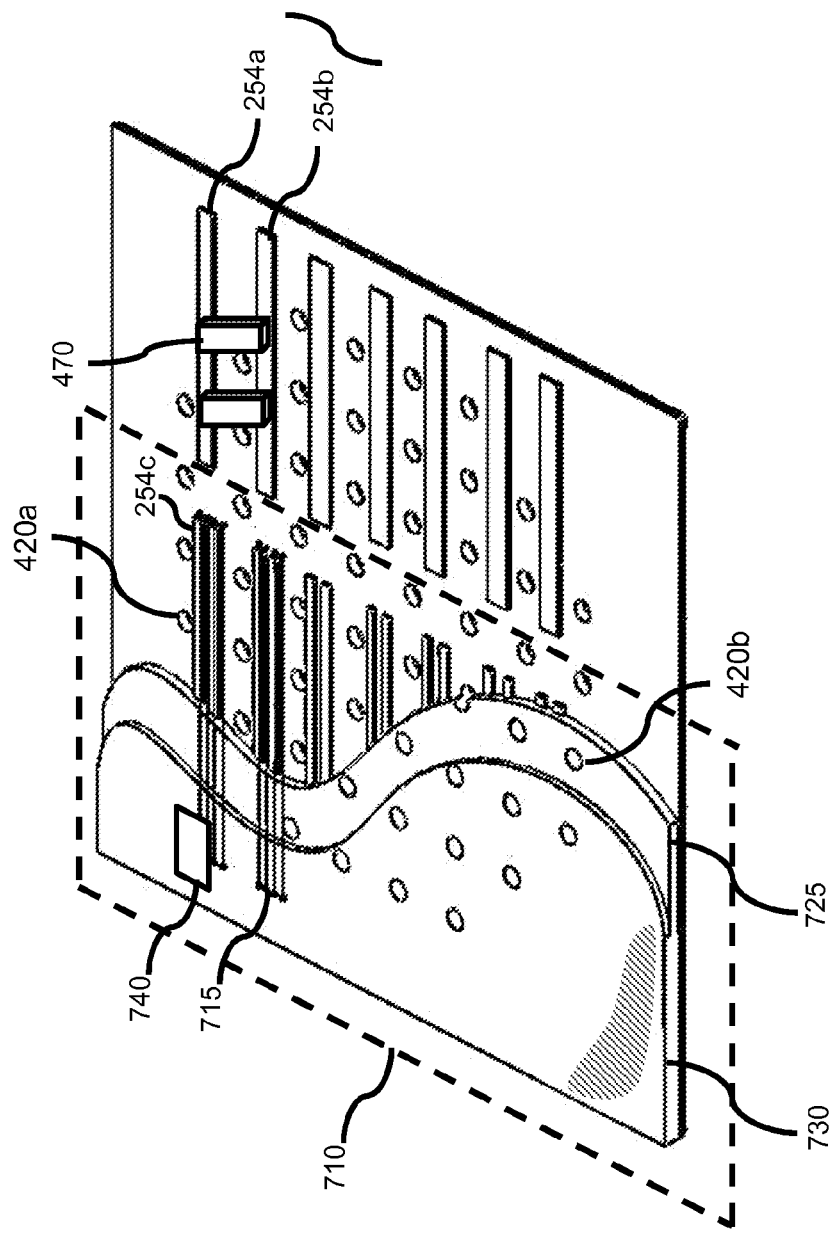

FIG. 7 illustrates various elements of an indicator light assembly including insulating electrical substrate with light emitting elements in accordance with one embodiment of the present technology.

Figure 8:
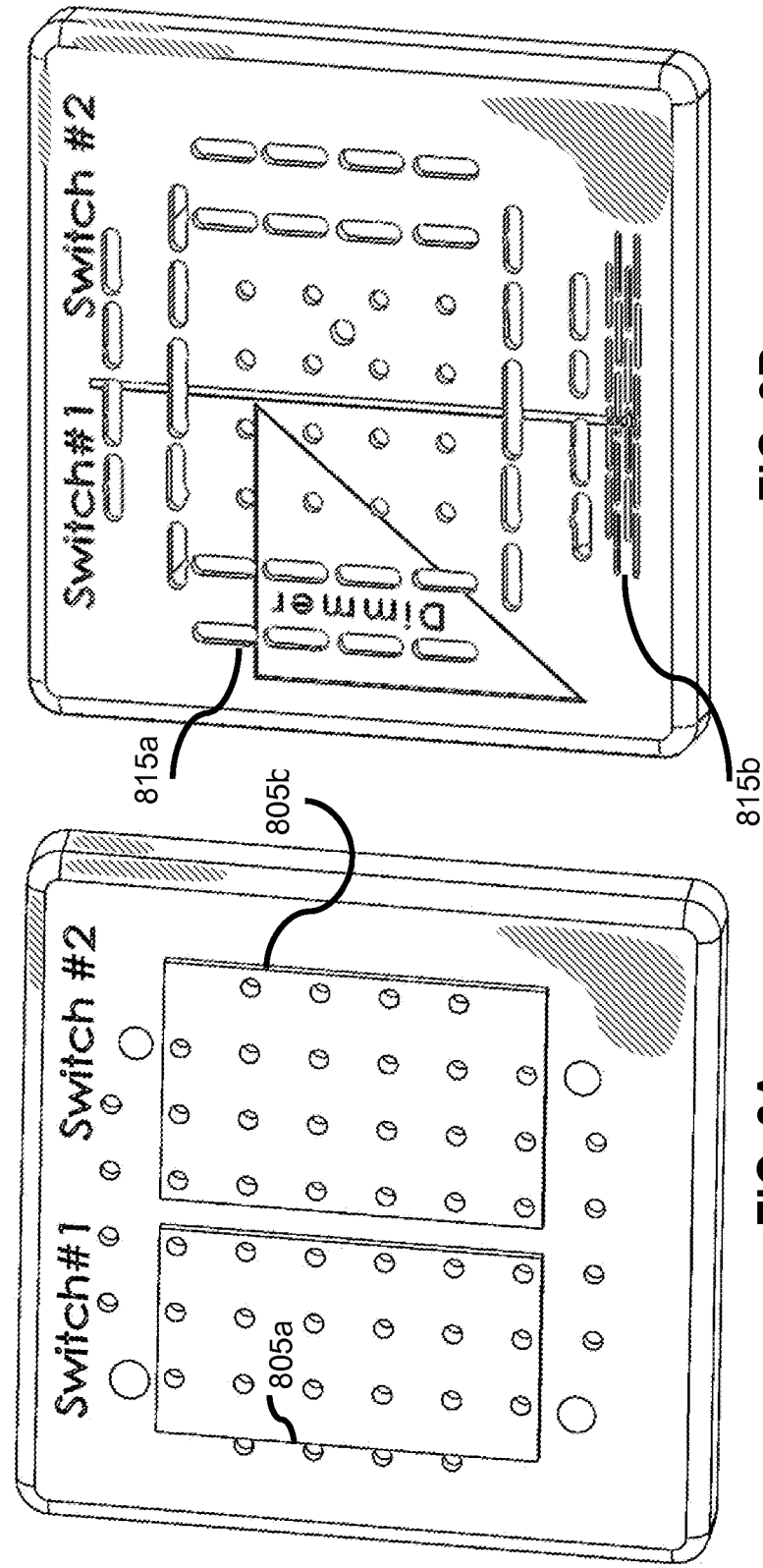

FIGS. 8A and 8B illustrate exemplary front views of a faceplate with a speaker grille operable to sense direct user interaction in accordance with one embodiment of the present technology.

Figure 9:
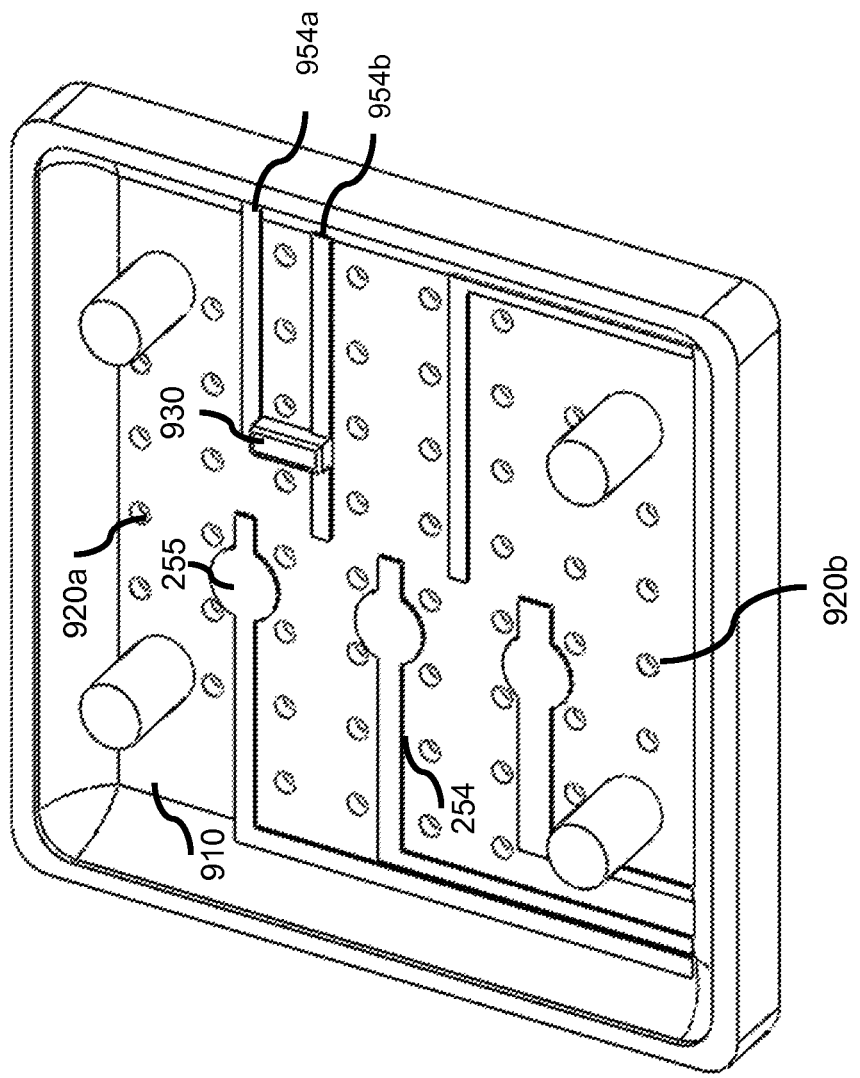

FIG. 9 illustrates an exemplary rear view of a faceplate with a touch sensitive speaker grille in accordance with one embodiment of the present technology.

Figure 10:
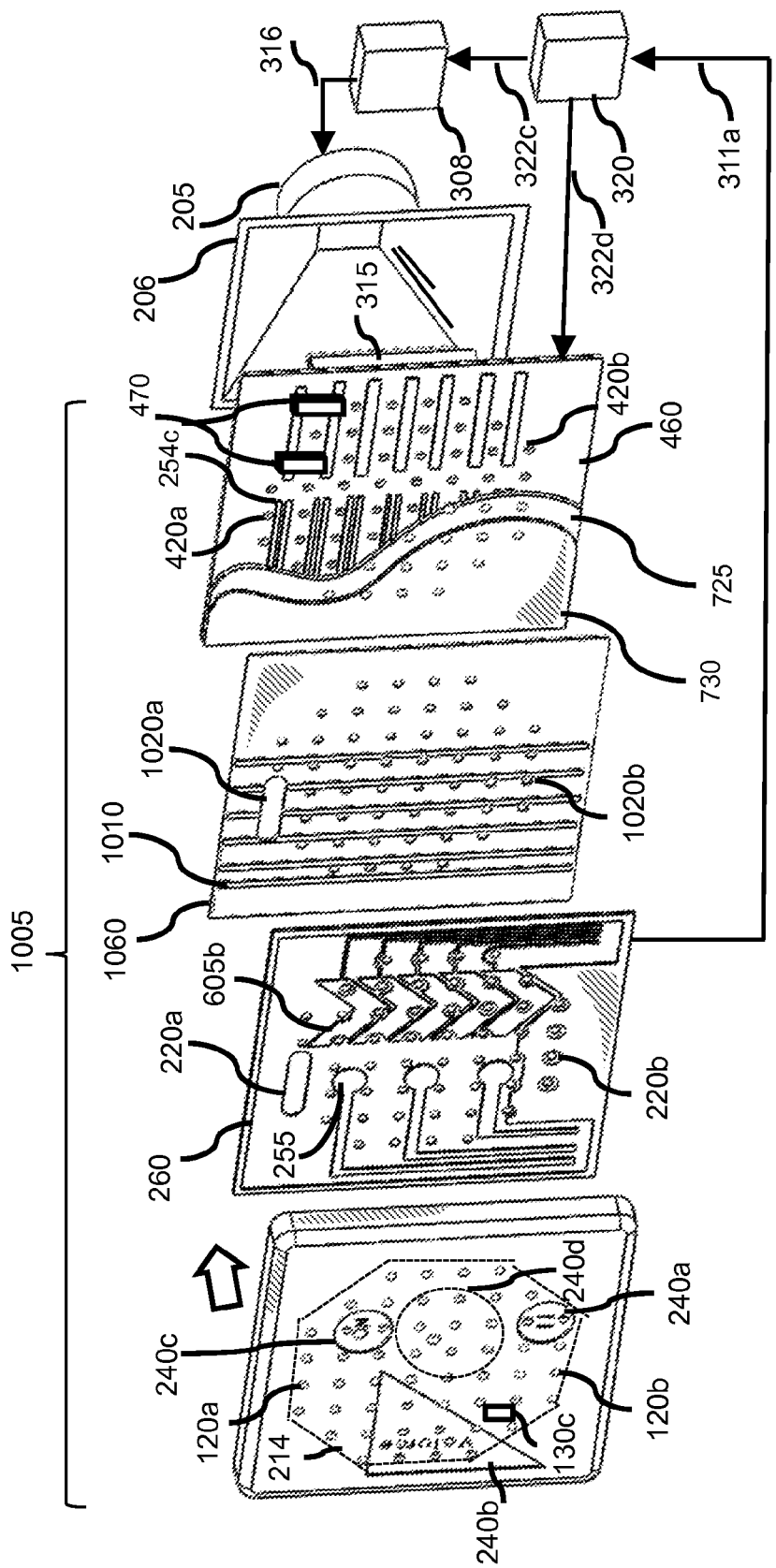

FIG. 10 illustrates is a disassembled view of an interactive speaker grille in accordance with an embodiment of the present invention.

Figure 11:
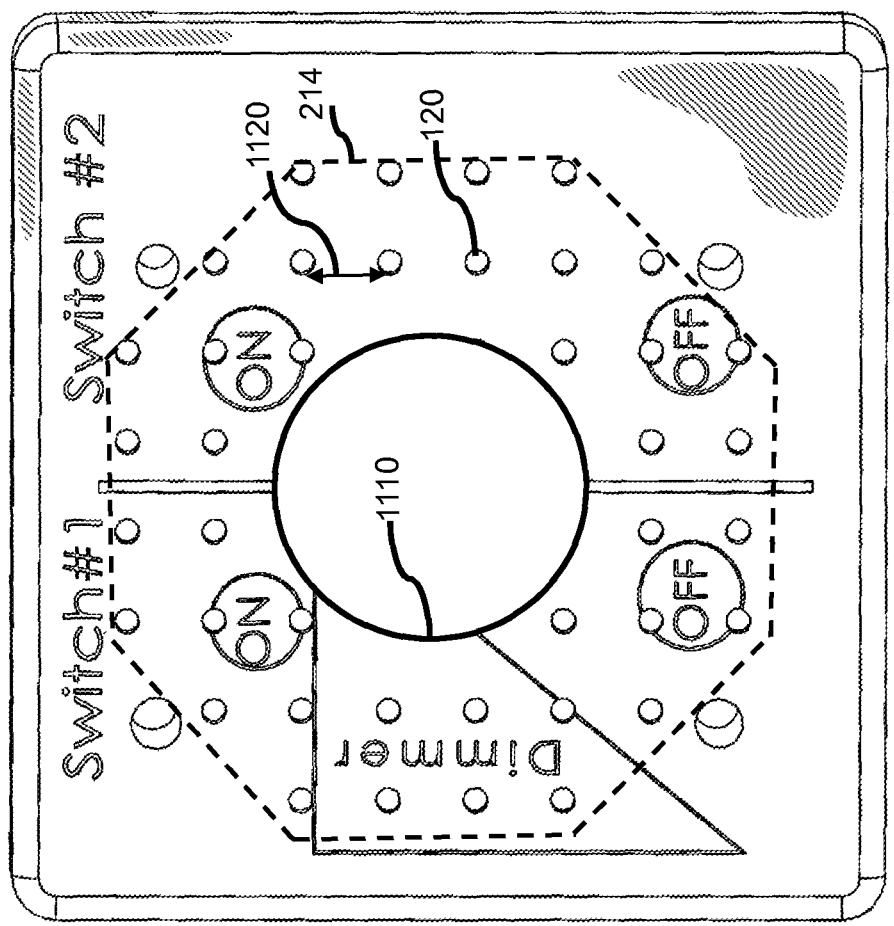

FIG. 11 illustrates exemplary front views of a faceplate with a speaker grille and solid center section in accordance with one embodiment of the present technology.

Figure 12:
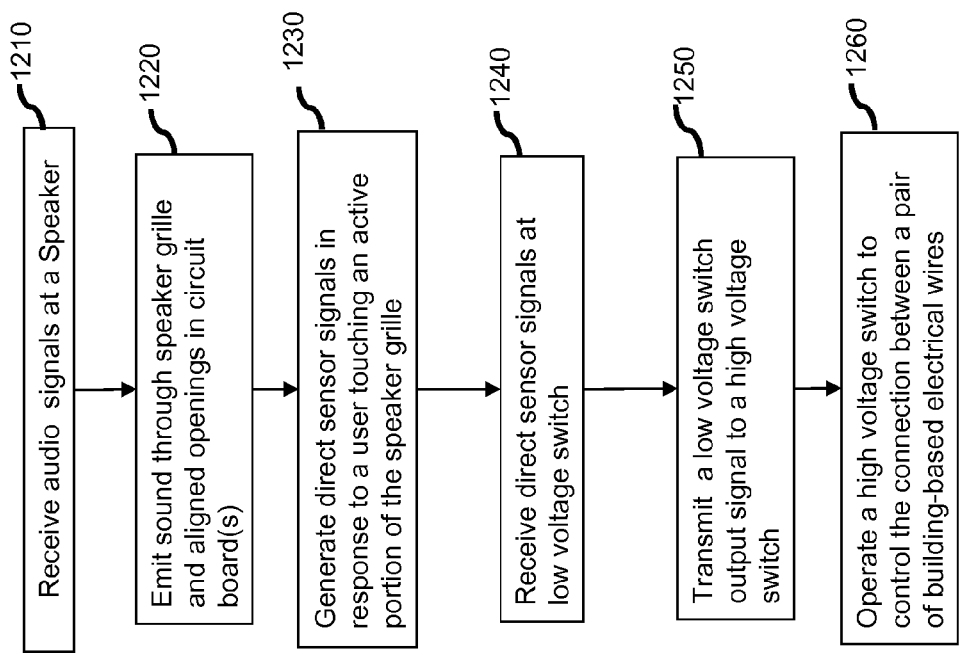

FIG. 12 is a flow chart diagram that outlines the operation of an electrical switch assembly with audio capability in accordance with an aspect of the present disclosure.

Figure 13:
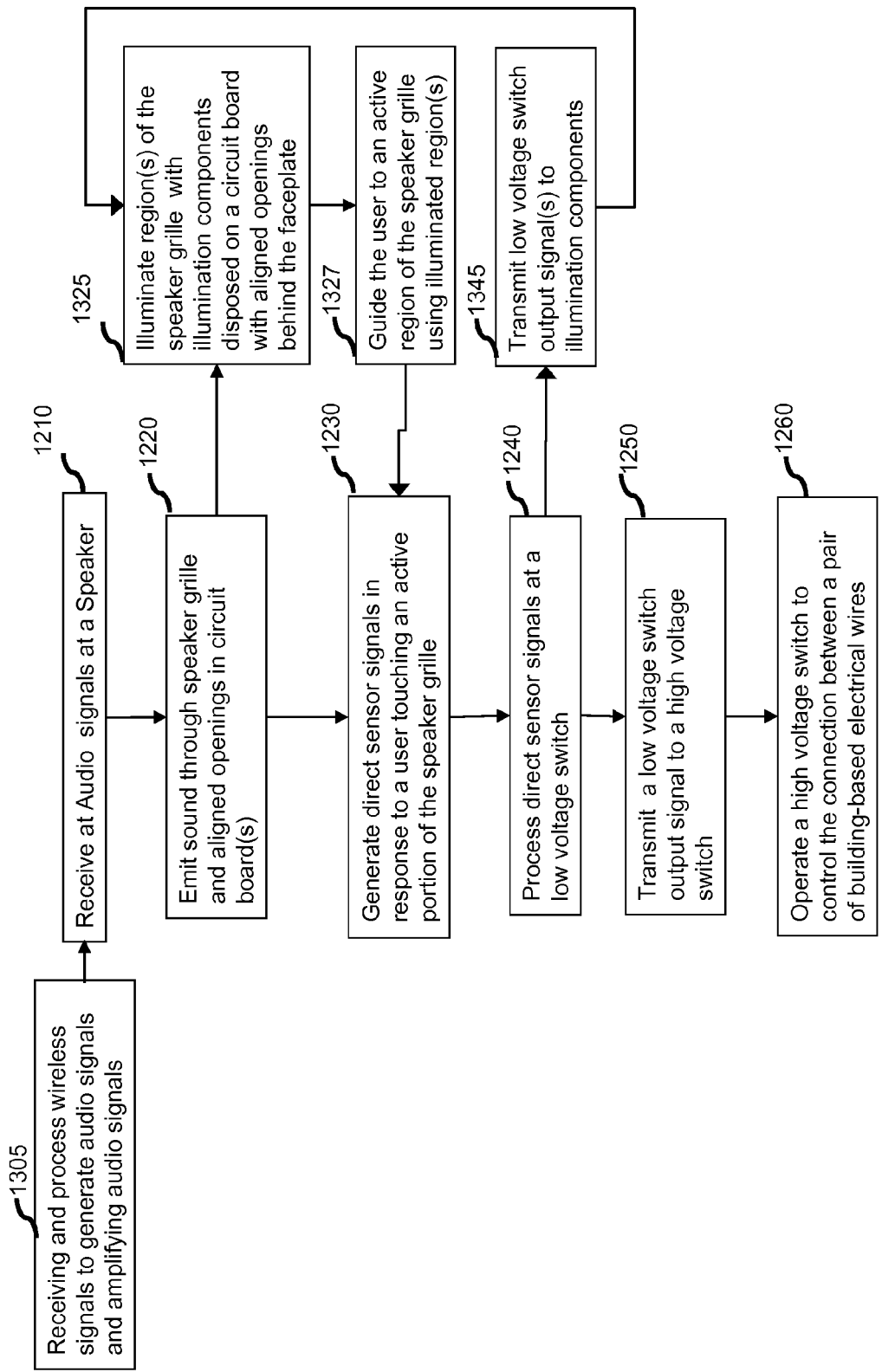

FIG. 13 is a flow chart diagram that outlines the operation of an electrical switch assembly with audio capability and illuminated switch indication in accordance with an aspect of the present disclosure.

Figure 14:
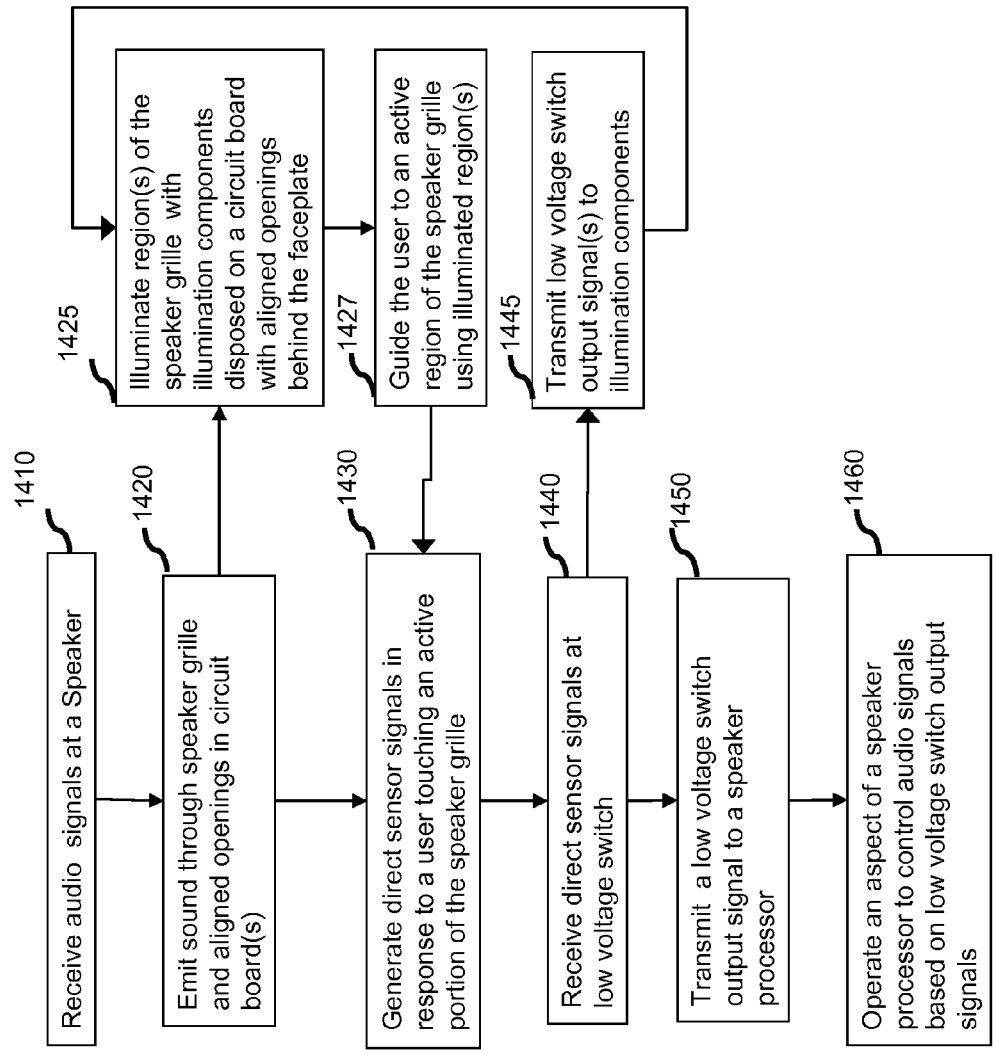

FIG. 14 is a flow chart diagram that outlines the operation of an interactive speaker grille with audio capability and illuminated grille regions in accordance with an aspect of the present disclosure.

Figure 15:
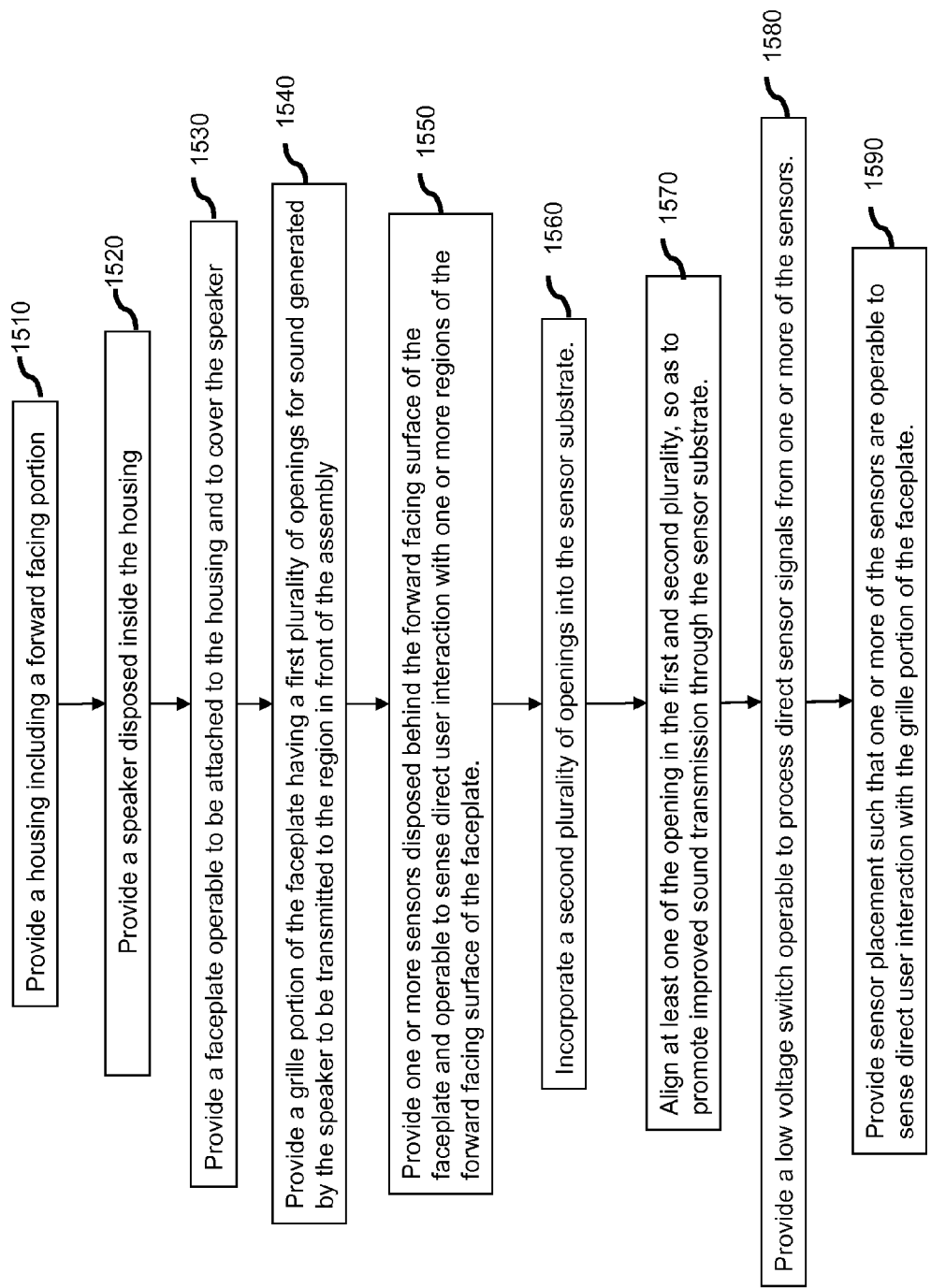

FIG. 15 is a flow chart diagram that outlines the operations associated with integrating an electrical switch assembly with audio capability, including a touch sensitive speaker grille.

DETAILED DESCRIPTION

FIG. 1-FIG. 11

In the following detailed description, for purposes of explanation, numerous specific details are set forth to provide a thorough understanding of the various implementations of the present invention. Those of ordinary skill in the art will realize that these various implementations of the present invention are illustrative only and are not intended to be limiting in any way. Other implementations of the present invention will readily suggest themselves to such skilled persons having the benefit of this disclosure.

In addition, for clarity purposes, not all of the routine features of the implementations described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more implementations are described further herein in the context of a typical building based electrical switch assembly used in a residential home, such as single-family residential home, the scope of the present teachings is not so limited. More generally, electrical switches with audio capability according to one or more of the preferred implementations are applicable for a wide variety of buildings having one or more speakers including, without limitation, duplexes, townhomes, multi-unit apartment buildings, hotels, retail stores, office buildings and industrial buildings. Further it is to be appreciated that an electrical switch with audio capability according to the implementations disclosed could be implemented in ships and airplanes. Further, it is to be appreciated that while the terms user, customer, installer, homeowner, occupant, guest, tenant, landlord, repair person, and the like may be used to refer to the person or persons who are interacting with the speaker or other device or user interface in the context of one or more scenarios described herein, these references are by no means to be considered as limiting the scope of the present teachings with respect to the person or persons who are performing such actions.

Figure 1:
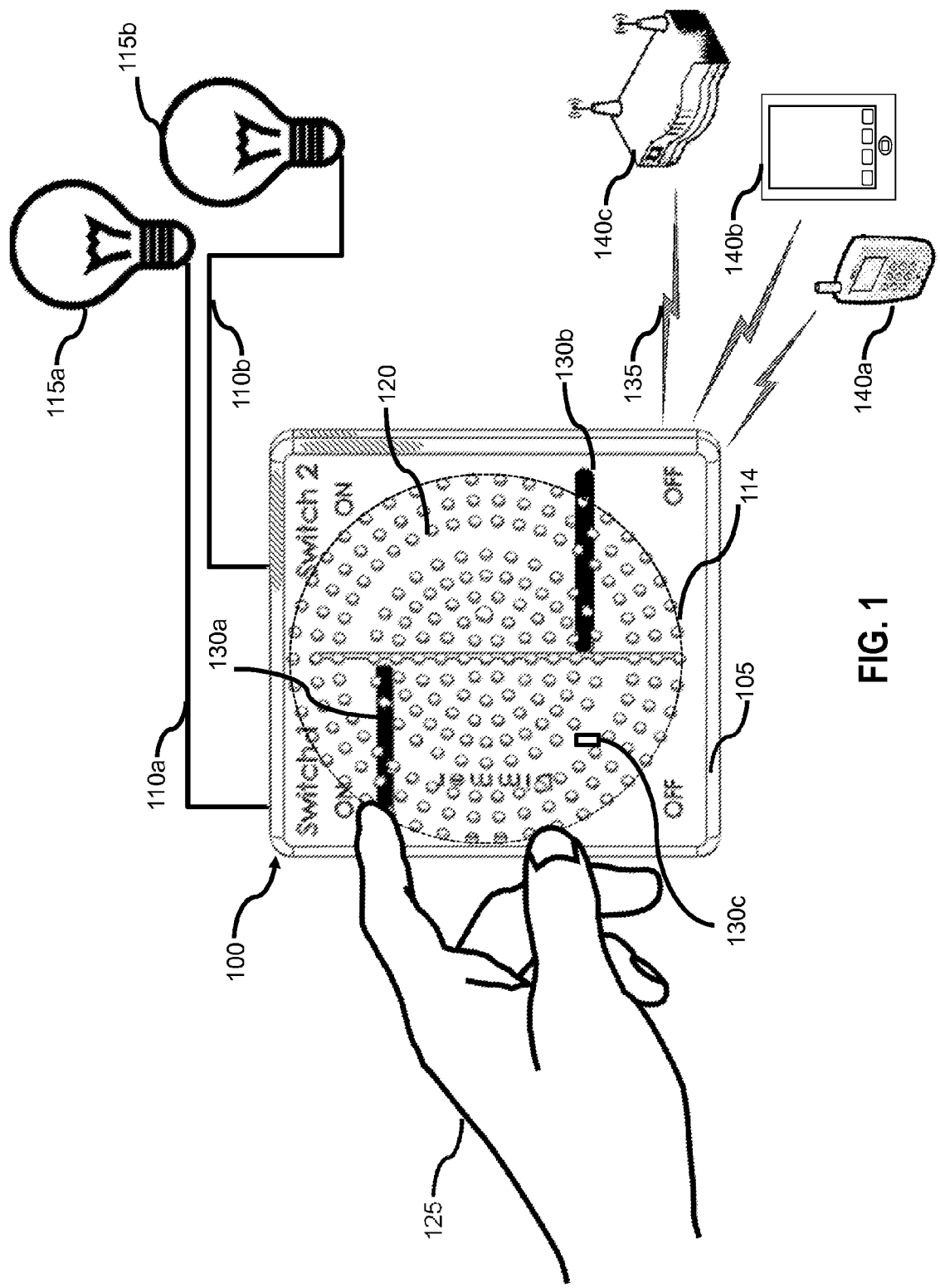
FIG. 1 is an exemplary diagram of the front faceplate of an electrical switch assembly with audio capability and means for a user to operate two switches in accordance with an aspect of the present disclosure.

FIG. 1 is a diagram illustrating the front view of an exemplary wall-mounted electrical switch assembly 100 in accordance with an embodiment of the present disclosure. The electrical switch assembly 100 is designed to reside in an electrical junction box (not shown in FIG. 1). FIG. 1 illustrates a 2-bay switch assembly. A touch sensitive faceplate 105 controls power to two wires 110a and 110b and thereby controls the operation of two lights 115a and 115b. Alternative implementations of this disclosure can include other sizes of electrical switch assembly optimized for different sizes of electrical junction box designed to serve different numbers of building-based electrical devices (e.g. Lights, switch operated electrical outlets or garbage disposals). For example, a single bay junction box is common in many bedrooms to accommodate a single light switch, while other locations may have three or four bay junction boxes. Faceplate 105 contains a plurality of openings 120 that form a speaker grille 114. A substantial portion of the faceplate 105 can be occupied by speaker grille 114 (e.g. 50-100% of the total area of the front surface of faceplate 105). Grille 114 protects a speaker (not shown in FIG. 1) located behind the faceplate while enabling effective sound transmission through the openings 120. The faceplate, and in particular speaker grille 114, is touch-sensitive, thereby enabling a person 125 to touch portions of the speaker grille 114 to operate lights 115a and 115b. Speaker grille 114 combines a variety of functions including sound transmission, light switch control, speaker protection and user protection. Aspects of the present disclosure show how to implement touch sensor functionality, while providing sound transmission through a large number of openings in the grille 114. The touch sensitive speaker grille 114 and faceplate 105 can register binary user commands (e.g. ON/OFF) as well as continuum user input commands (e.g. increase illumination with a dimmer). Elements 130a, 130b and 130c are regions of the faceplate that illuminate in order to further facilitate a user 125 with visual feedback. For example elements 130a and 130b can show the present state of the electrical switches number 1 and number 2 (e.g. ON/OFF/dimmed). In one implementation elements 130a and 130b are two elongated lines of light indicating the position of two dimmer switches. The user 125 can touch the faceplate 105 and drag the illuminated indication regions 130a and 130b up or down to a desired location and controlling lights 115 in the process. Faceplate 105 designed in accordance with the present disclosure provides means for visual switch position indication and touch sensitive surfaces while facilitating sound transmission with a large speaker grille portion 114. In some implementations the touch sensitive speaker grille 114 can provide improved access for sensors positioned behind the faceplate (e.g. passive Infrared, active infrared proximity sensors or temperature sensors) to measure the environment in the region in front of the faceplate 105. In some implementations sensors located behind the touch-sensitive speaker grille can provide enhanced sensing of a person in the vicinity of the switch assembly and illuminate regions 130a, 130b and 130c when a person is nearby. In the implementation illustrated in FIG. 1 electrical switch assembly 100, receives wireless signals 135 and can play music or audio messages from a variety of wireless devices 140, for example a smartphone 140a, a tablet PC 140b or a media server 140c. The media server 140c can be an internet gateway (e.g. a home broadband internet router) and transmit internet radio content to electrical switch assembly 100.

Figure 2A:
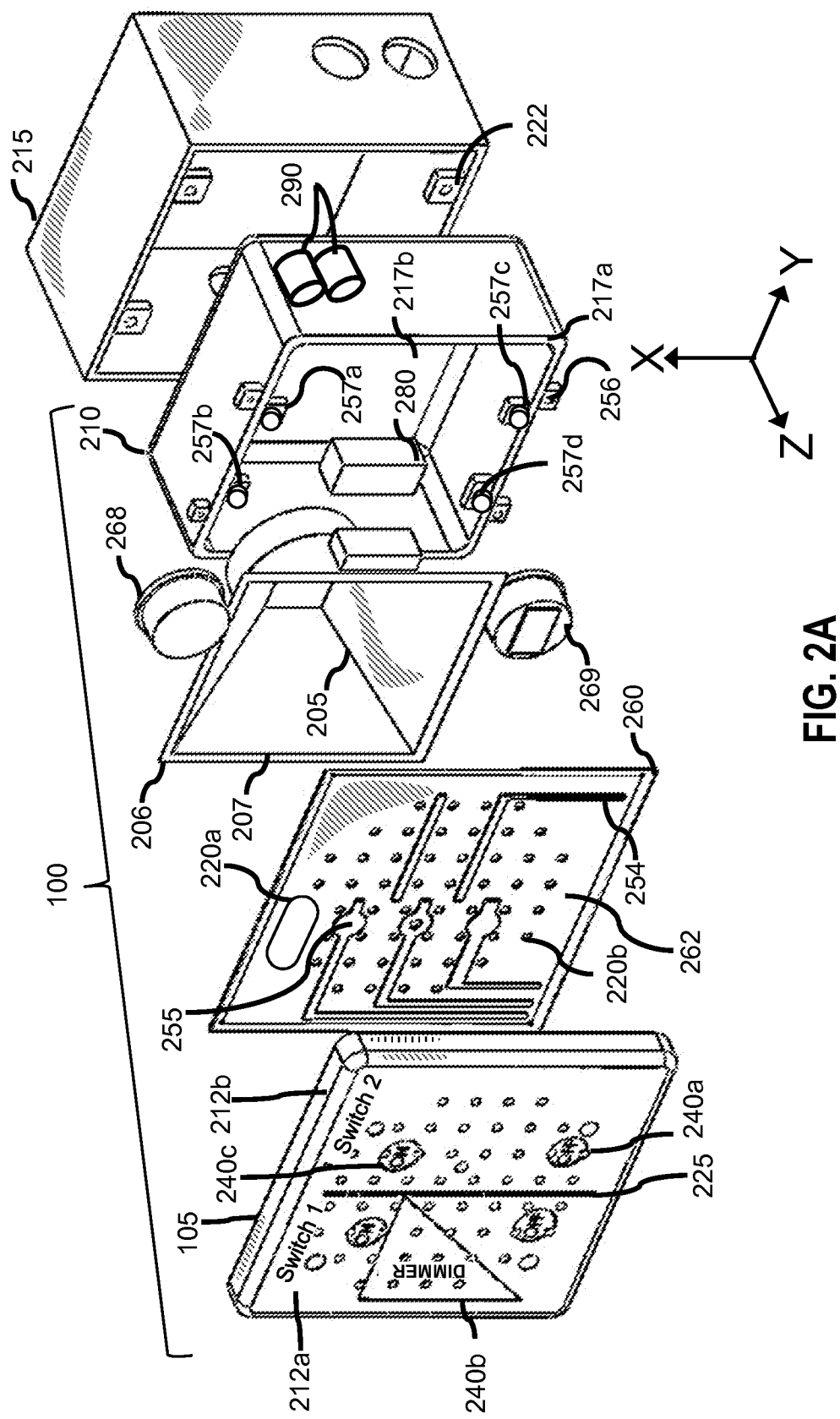
FIGS. 2A and 2B is a disassembled view of an electrical switch assembly with audio capability, including a speaker, and a touch sensitive faceplate in accordance with an embodiment of the present invention.
Figure 2B:
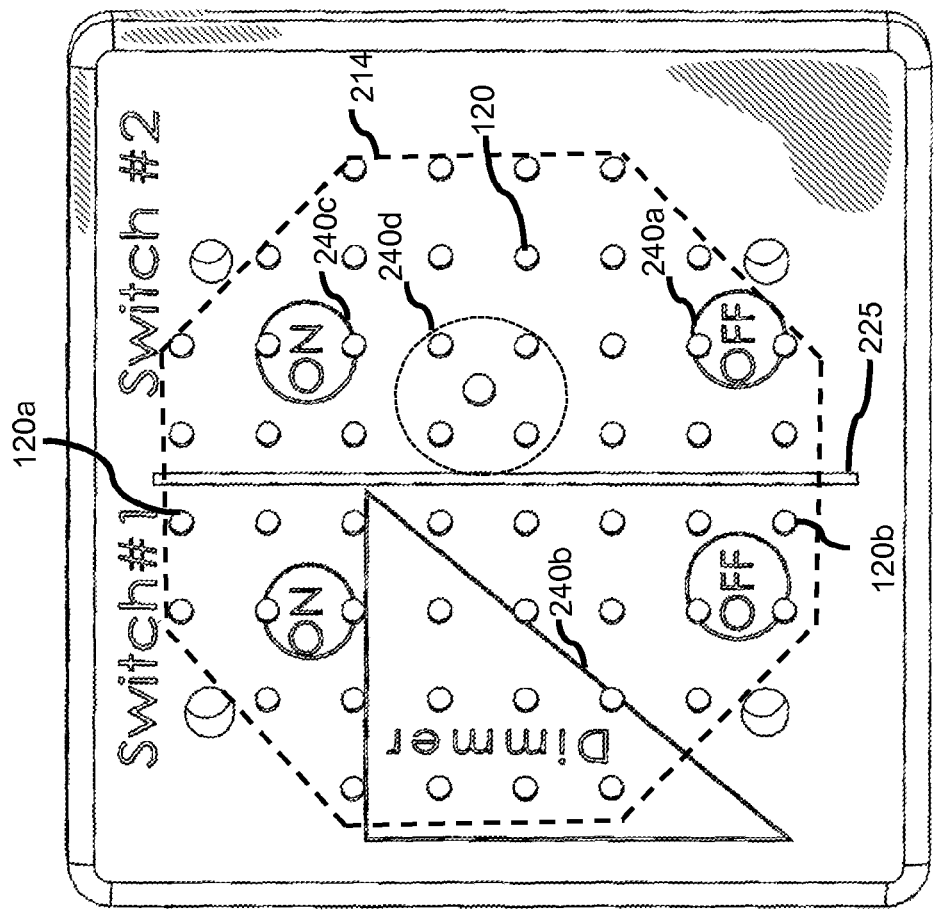

FIGS. 2A and 2B are disassembled views of an electrical switch assembly including a speaker grille 214 that can sense direct user interaction (e.g. touch or pressure) in accordance with one implementation of the present disclosure. Switch assembly 100 contains a housing 210. Housing 210 is a mechanical enclosure for components of electrical switch assembly 100. In one implementation housing 210 provides electrical and mechanical separation for components in electrical switch assembly 100 from the contents (e.g. wires) in an electrical junction box 215. Housing 210 can contain two or more electrical terminals 290 operable to be attached to building-based wiring. Building based wiring can include wiring within the walls of a building or carried in metallic or plastic tubing for the purpose of electrically connecting switches and service points in the building. Service points can include wall mounted electrical sockets, HVAC equipment, sprinkler components and lighting fixtures in ceilings and walls. Examples of terminals 290 include screw terminal (e.g. those found on many light switches) and wire pigtails (e.g. a length of wire protruding from the housing). Housing 210 may be sized to fit in an electrical junction box 215 of a particular size. For example the two-bay junction box illustrated in FIG. 1 is approximately 4 inches wide and can accommodate two standard electrical light switches. The exemplary housing 210 in FIG. 1 is approximately 4 inches wide and 4 inches high and is designed to fit inside the majority of two-bay electrical junction boxes. Housing 210 has forward facing surfaces 217a and 217b.

Housing 210 contains a speaker 205 operable to generate sound in the region of the assembly. Speaker 205 functions to emit sound through the grille portion 214 of faceplate 105. Grille 214 and grille 114 are operable similar exemplary grilles with different shapes. Speaker 205 can be an electromagnetic type speaker with an external or internal electromagnet. In FIG. 2A speaker 205 is located centrally in housing 210 and can occupy the position traditionally occupied by one or more mechanical switches. In another aspect of several embodiments the speaker grille is designed to fulfill the function of the electrical switches, including dimmer switches, that would traditionally occupy the space where speaker 205 is placed. Speaker 205 can have mounting features securing it to the housing 210 and in some embodiments an air-tight seal is be formed between speaker 205 and housing 210 that enables further audio quality enhancement. Speaker 205 can have a mounting flange 206 operable to secure the speaker to housing 210. Mounting flange 206 can have a variety of shapes including square or circular. Speaker 205 has a speaker cone 207 operable to move in the positive and negative Z direction when the electromagnet in the speaker is energized. The cone has a forward facing surface operable to project sound in the Z direction. In one embodiment the electrical switch assembly is designed to fit inside a 1-bay electrical junction box with dimensions of approximately 2 inches in the Y direction of FIG. 2A and 4 inches in the direction of X in FIG. 2B. In this embodiment the assembly 100 could contain a 3 W 4 ohm speaker with a speaker cone with a diameter of approximately 50 mm. In another embodiment the electrical switch assembly 100 is designed to fit inside a 2-bay electrical junction box with dimensions of approximately 4 inches in the Y direction of FIG. 2A and 4 inches in the positive X direction in FIG. 2B. In this embodiment assembly 100 can contain a larger speaker with a cone of diameter 76 mm. Speaker 205 could be model number 1-530-767-12 from Sony. Speaker 205 can have a similar design to the speaker component used in a portable Bluetooth or Wi-Fi enabled wireless speaker, for example Jawbone Jambox®. In some embodiments electrical switch assembly 100 can include two or more speakers. This is sometimes advantageous when more sound volume is required than can be provided by a single speaker.

Electrical switch assembly 100 can contain a faceplate 105 with a front surface including portions 212a and 212b. The front surface can include a large portion 212a in the X-Y plane and can also include the edges of the faceplate 212b. The front surface including portions 212a and 212b provide surface for the user to interact while at the same time faceplate 105 provides electrical isolation, between the user and high voltage components in the switch assembly behind the faceplate. Faceplate 105 can be constructed from a variety of materials including plastics, glass or enamel covered metal or metal. Faceplate 105 can be flat with rounded edges as illustrated in FIG. 2A and FIG. 2B. In other embodiments faceplate 105 can have a curved structure that can provide increased mechanical stiffness, when the front of the faceplate is touched or pressed. Faceplate 105 can contain one or more ribs molded on the interior surfaces to further increase mechanical stiffness. Faceplate 105 can function to conceal the gaps between the enclosure 210 and the electrical junction box 215. The faceplate provides an aesthetically pleasing front surface for the user to interact with while concealing gaps between paint or drywall interfaces and junction box 215. FIG. 2B illustrates that faceplate 105 contains a plurality of openings 120 that form a speaker grille portion 214 of the faceplate. Openings 120 can have a variety of shapes including circular, diamond, or oval. Speaker grille 214 is designed to transmit sound into the air space in front of the faceplate in a manner so as to provide effective sound to a user in the vicinity of the electrical switch assembly. FIG. 11 illustrates that speaker grille can be disposed as a complex shape comprising a plurality of openings 120 surround one or more solid sections 1110. A solid section 1110 could be a decorative surface for a manufacturer to place a logo, hold a button, hold a touch sensitive button or an illuminated element. In the context of this disclosure a speaker grille refers to a portion of the faceplate 105 comprising a plurality of openings operable to transmit sound from a speaker and would not include the solid section 1110 illustrated in FIG. 11. In some embodiment the grille comprises several small clusters of openings. In this case the grille can refer to the combined portions of the faceplate covered by the openings. In the absence of molded features, edges or material differences delineating the boundary of the speaker grille 214 portion of faceplate 105, the grille portion can considered to be bounded by straight lines joining the points on the perimeter of those openings that form the perimeter of a plurality of openings. Faceplate 105 contains one or more regions 240 wherein direct user input (e.g., touching, swiping or pressing) is operable to be sensed by one or more sensor electrodes 255. For example regions 240a, 240b and 240c in FIG. 2A are exemplary touch sensitive regions used to control the operation of two electrical switches. In one implementation user input region 240a functions as a binary switch to turn off switch number 2. While the exact mechanism for turning off switch number 2 in response to direct user input is detailed later, it can be appreciated that regions 240 are operable to initiate the process of controlling one or more electrical switches. For example the region 240c is operable to receive direct user input and direct user input sensors 330 (in FIG. 3) behind the faceplate can initiate the turn on of switch number 2. In another example a user input region 240b of the faceplate 105 can function to act as analog switch, capable of controlling light 115a to have a value within a range of switch values (e.g. from 0 to 100). Examples of analog switches include slider actuators, dimmer switches, rotary dial switches. Physical features on the faceplate can indicate the intended function of a region. For example in FIG. 2B switch number 1 and switch number 2 can be separated by a molded feature 225 delineating the boundary between the two switches on the common faceplate. Features 225 can also be deposited on the faceplate using other technologies including printing, etching, painting, overlay or electroplating. User input regions can control a function that is variable and dynamically defined by a computer processor. Region 240d illustrate an example of a region that could initiate a plurality of control functions in a speaker application for example changing the volume, selecting a song, playing or pausing music or selecting an input source. In one implementation the function of 240d can be defined by the direction or gesture the user makes while touching the region. For example swiping up and down may control light switch functionality, while swiping from left to right may decrease sound volume of the speaker and right to left may increase sound volume. The differentiation of these functions can be provided by the sequence of sensors 330 (in FIG. 3) activated behind the front surface of region 240*d*. The function of region 240*d* can be based in part the prior sequence of regions 240 that the user has interacted with. Illuminated sections of the faceplate 130 can indicate the present functionality of region 240*d*.

In the embodiment illustrated in FIG. 2B speaker grille 214 occupies a large portion of the faceplate 105. In this context a large portion can range from 30-100% of the faceplate area. In one aspect of this disclosure user input regions 240 overlap with grille 214. In some embodiments user input regions can be fully contained within the grille portion of the faceplate. Speaker grilles are common on most speakers, where they provide mechanical protection for the sensitive speaker components while providing a path for sound vibrations to be emitted.

Electrical switch faceplates are required to provide electrical insulation between a user and high voltage components (e.g. wires) inside the junction box. In one aspect of the present disclosure electrical switch assembly 100 has a speaker grille 214 made from an electrically insulating material, for example plastic, glass, glass filled plastic, or ceramic. In one embodiment shown in FIG. 2A and FIG. 2B the grille and the surrounding area of the faceplate are made from the same piece of plastic, with the grille comprising a plurality of openings 120 covering the center section of the faceplate. In other embodiments the grille may be different material from the rest of faceplate, for example a plastic grille with an insulated metallic faceplate. The openings can be a wide variety of shapes (e.g. circular, square or elongated slots). A speaker grille is a combination of openings 120 and solid portions between the openings. The arrangement of openings and solid portions often forms a pattern and enhances the aesthetic appeal of the speaker enclosure. The combination of openings 120 and solid support material is designed to achieve competing goals of blocking or filtering objects larger than the grille openings while enabling air and sound waves to pass through the grille. The grille is not a perfect sound transmitter. The solid portions of the grille attenuate or diminish several physical properties such as sound intensity, light intensity and air flow. Sound attenuation can be caused by sound reflected back towards the speaker as it attempts to pass through the grille.

FIG. 2A illustrates a circuit board 260 behind the faceplate 105 and placed in front of the speaker 205. The circuit board has an insulating substrate 262 that functions to hold conductors 254 and sensor electrodes 255 operable to sense direct user input. Conductors 254 can function to carry signals to and from sensor electrodes and can have a large ratio of length to width (e.g. >100). Modern circuit board manufacturing technologies such as photolithography and foil etching can produce conductor features 254 as narrow as 40 micrometers. Electrodes are operable to sense an aspect of a user (e.g., capacitive or resistance changes associated with a user touching the front surface of faceplate 105. Electrodes can have a larger surface are and smaller aspect ratio than conductors on the same circuit board. Circuit board 260 has a plurality of openings (e.g. 220*a* and 220*b*). Openings 220*a* and 220*b* function to enable sound from the speaker 205 to pass through the substrate. Openings 220 are designed to align with openings 120 in the faceplate so as to not to add to the overall sound attenuation and reflection of the grille. In one implementation opening 220*a* is larger than the corresponding opening 120*a* in the faceplate and can be large enough to cover multiple holes in the front faceplate. In one implementation 220*a* can be larger than the opening 120*a* in the speaker grille. For example openings 220*a* could be a slot encompassing two openings in the faceplate. In some embodiments circuit board 260 can be a rigid circuit board made from layers of fiberglass and epoxy with deposited conductors. In other implementations circuit board 260 is a flexible circuit board. The faceplate 105 with speaker grille 214 can be combined with one or more circuit boards 260 to form an interactive grille. The interactive grille enables the switch assembly to transmit sound while accomplishing the task of switch power to household items. The switching functionality is accomplished by splitting the switching task into two functions sensing and power switching. The interactive grille enables the sensing to take place on the sound transmitting grille while the power switching is accomplished by circuitry located away from the path of sound transmission. Examples of circuitry located away from the path of sound transmission include low voltage switches and high voltage switches located behind the speaker in enclosure 210. One high voltage switch 280 is illustrated behind the speaker in FIG. 2A. In the context of this disclosure high voltage refers to voltages with magnitudes greater than 20 volts. Low voltage refers to voltages with magnitudes in the range 0-20 volts. Examples of high voltage switches include electromechanical relays, solid state relays and triacs. A triac is a fast solid state switch often used to implement dimmer switches in buildings. Grille 214 can be larger than the speaker cone 207 extend beyond the speaker in the X-Y plane, thereby providing the benefits of access to the surrounding air to additional sensors in the electrical switch assembly. The speaker cone 207 is defined by the inside perimeter of speaker flange 206. For example a microphone 268 could be placed in the housing and behind the grille, whereby the interactive grille provides improved sound coupling and therefore improved sound sensing in the vicinity of switch assembly 100. Similarly, a passive infrared sensor 269 can be placed behind the interactive grille to sense motion in the vicinity of the speaker. Openings in the grille provide enhanced motion sensitivity. In other embodiment some or all of the sensor electrodes 255 can be deposited directly onto the rear surface of the speaker grille using electroplating or conductive inks. It would be known to someone skilled in the art that conductors and electrodes can be deposited on 3-dimensional polymer parts using modern technologies such as Laser Direct Structuring (LDS) or Molded Interconnect Device MID technology.

Mounting features 256 on the housing 210 can be connected to corresponding mounting features 222 on the electrical junction box 215. For example 256 can be an oblong opening in the housing 210 and feature 222 can be a threaded hole. A screw could be used to connect 256 and 222. This arrangement enables fine adjustment of the orientation of the housing. In some embodiments additional mounting features 257*a-d* are operable to secure faceplate 105 to the housing 210. In several embodiments mounting features 257*a-d* are load sensors. This enables the faceplate to be attached to the housing in a manner enables the load sensors 257*a-d* to generate sensor signals when the faceplate is touched or pressed. For example mounting features 257*a-d* could be planar beam type load sensors such as those available from Omega Engineering INC, Stamford Conn. In some embodiments there may more or less load sensors than the four shown in FIG. 2A. In response to a user touching or swiping an area of the faceplate the timing and sequence of load sensors values can be used to determine the area touched and the motion pathway (e.g., swipe in the up direction or down direction)

Figure 3:
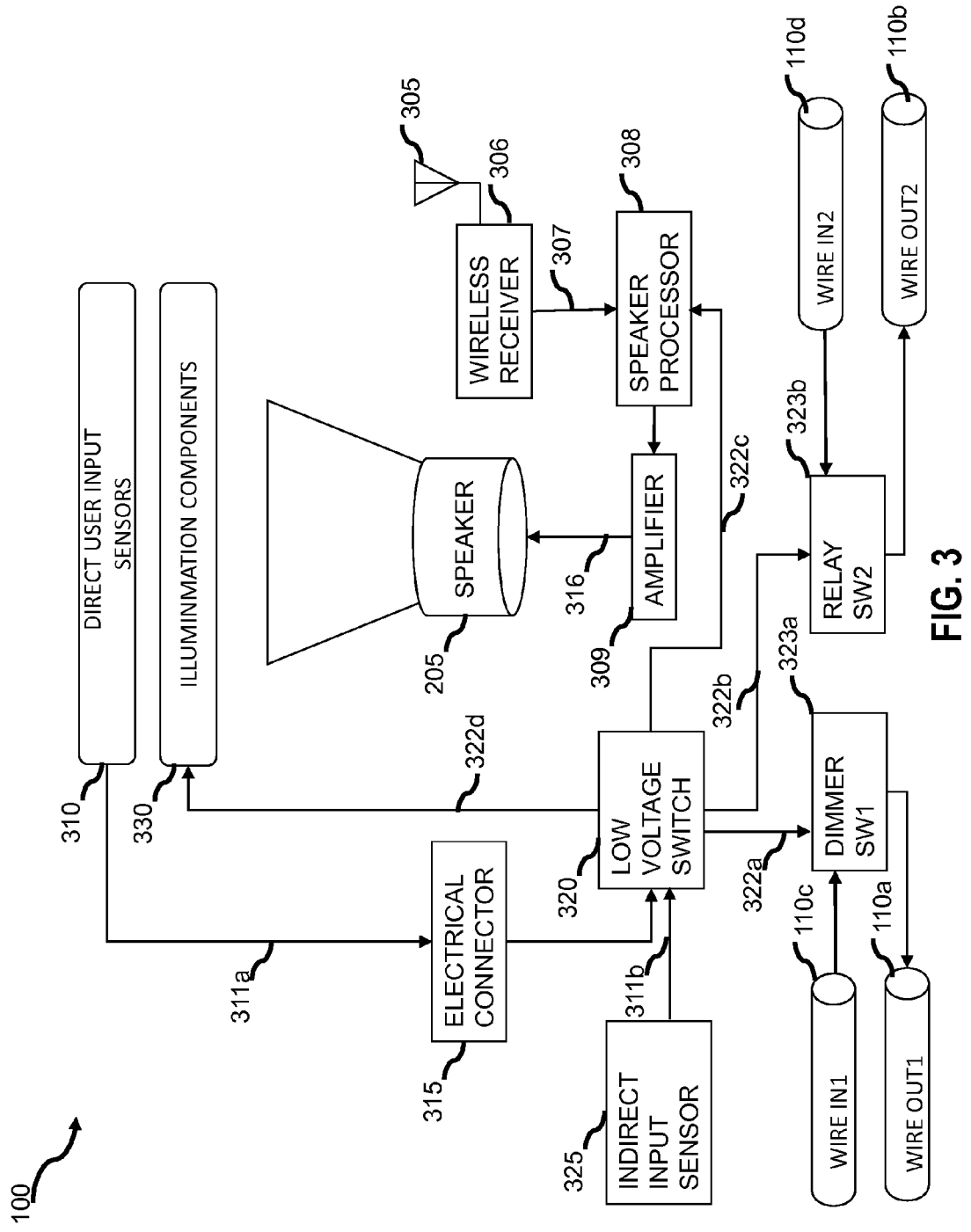
FIG. 3 is a block diagram illustrating various components of an electrical switch assembly with audio capability in accordance with one embodiment of the present technology.

FIG. 3 is a block diagram of an exemplary electrical switch assembly 100, illustrating electrical components used to provide the two functions of sound transmission and electrical switching in accordance with one implementation of the disclosure. Wireless devices 140 can transmit wireless signals 135 to the electrical switch assembly 100. Switch assembly 100 contains an antenna 305 to receive wireless signals 135. Antenna 305 can be printed on a circuit board, a discrete stamped metal component or an electroplated feature on a surface. In one embodiment of the disclosure the antenna can be deposited or attached to a subassembly including faceplate 105. On advantage of attaching or depositing the antenna on the faceplate is that placement of the antenna outside of the metal junction box can improve the antenna range and sensitivity. The antenna is operably coupled to a wireless receiver 306. Receiver 306 can be operable to receive and demodulate a variety of common wireless audio protocols such as amplitude modulated (AM) or frequency modulated (FM) radio signals (e.g. 88.9-107.7 MHz), Bluetooth, Wi-Fi or Apple Airplay®. Receiver 306 can be part of a transceiver module that also includes transmission capability. Receiver 306 transmits demodulated wireless messages 307 to a speaker processor 308. The speaker process performs operations to convert the digital wireless messages into audio frequencies. These operations can include digital-to-analog conversion, amplification, equalization, error correction, echo cancellation, bass enhancement, or introducing a delay to one or more frequency components. Speaker process 308 and wireless receiver 306 can be integrated into a single module or microchip. For example a Bluetooth wireless speaker can have a single chip receiver and speaker processor. Electrical switch assembly 100 can include an audio amplifier 309. Amplifier 309 operates to receive audio signals from the speaker processor, to increase the power of these signals and to transmit amplified audio signals 316 to the speaker 205. Amplifier 309 can be a single chip amplifier or can comprise multiple discrete transistors. Amplifier 309 can be a class A, B, A/B C or D amplifier. Amplifier 309 transmits amplified signals to the speaker. Amplifier 309 can be for a PAM1803 Class D audio amplifier available from Diode INC, Plano Tex. The amplifier 309, speaker processor 308, and receiver 306 can be housed behind the speaker, away from the path of sound transmission.

Electrical switch assembly 100 contains a plurality of direct user input sensors 310. Direct user input sensors operate to sense direct user interaction with user input regions 240 of the faceplate 105. Examples of direct user interaction include touching or pressing the faceplate. Examples of direct user input sensors include sensor electrodes 255, 605a, 605b (shown in FIG. 6) and a load sensors 257a-d. Other examples of a direct user input sensor could be a membrane switch such as found on many modern appliances such as a washing machine or stove control panel. Direct user input sensors 310 can operate to sense direct user input based on a variety of standard technologies. Examples of direct user input technology are capacitive touch sensing, resistive touch sensing, surface acoustic wave touch sensing and pressure sensing. In surface acoustic touch sensing a surface acoustic wave is generated on the front surface of the faceplate by one or more transmitters. Aspects of the reflected signals (e.g. arrival time and intensity) are used to sense a user touching the faceplate surface. In response to direct user input, sensors 310 generate direct sensor signals 311a. Direct sensor signals 311a can be current, voltage, frequency or sound intensity changes associated with user input sensed by one or more direct user input sensors 310. In some embodiments an electrical connector 315 provides two separable halves that enable electrical connections to be made between conductors 254 and one or more low voltage switches 320. One half of electrical connector 315 may be disposed on a circuit board 260 and the other side may be disposed inside the housing 210. When a person attaches circuit board 260 to the housing 210 electrical connector 315 can connect electrical signals between conductors 254 and circuitry in the housing.

In one embodiment of the present disclosure, electrical switch assembly 100 provides the two functions of sound transmission and electrical load control using touch sensitive switches. In this embodiment the grille 214 is a touch sensitive surface while the other circuitry required to accomplish electrical switching function is positioned away from the sound transmission path of one or more centrally located speakers. The exemplary electrical switch assembly 100 illustrated in FIG. 3 contains a low voltage switches 320. Other implementations may contain multiple low voltage switches. The switch can be located in housing 210. The switch can function to convert sensor signals 311a and 311b into low voltage switch output signals 322. Low voltage switch 320 can comprise a microchip or microcontroller. Many modern microcontrollers can have dedicated circuitry designed to implement low voltage touch sensitive switches. For example the Texas Instruments MSP430 processor from and the MicroChip DSPic33 processor families have analog-to-digital circuitry operable to implement the functionality of the low voltage switch 320. In some embodiments this circuitry enables conversion of direct user interaction with a surface (e.g. touching or pressing) into low voltage switch output signals 322. In some embodiments sensor signals 311 can cause small changes in in the frequency of an oscillating circuit inside the low voltage switch 320. The processor is operable to measure these frequency changes and control one or more low voltage switch output signals 322 based on frequency changes. This type of frequency measurement is often used to transduce sensor signals from capacitive touch sensors. Several electrodes can be sequentially connected to a frequency measurement circuit inside low voltage switch 320 and switch 320 can identify when the user touches one or more of a large number (e.g. >50) of distinct regions on the faceplate 105. In other embodiments the low voltage switch 320 can include an analog-to-digital converter operable to sense small changes in voltage from sensors and generate digital values corresponding to the magnitude of sensor signals 311. A processor in the low voltage switch 320 can have a preset threshold for the change in magnitude or frequency that would correspond to a user touching the faceplate. When the low voltage switch 320 measures a change in frequency or magnitude sufficient to cross this threshold the state of an output pin on the low voltage switch can be changed. The change in state of the output pin can act as a low voltage switch output signal 322. In other embodiments low voltage switch 320 can include one or more elements designed to increase the output power of a low voltage switch signal. This process is sometimes called "buffering" and can be performed for the purpose of controlling high voltage switches 323. Examples of components that can perform buffering include power transistors and relays.

In some embodiments the low voltage switch 320 can accept a large number of sensor inputs 311 and can produce a large number of low voltage switch output signals 322, where a large number is for example fifty or more. In this way the low voltage switch can transduce a plurality of sensor inputs into distinct switch output signals. In some embodiments this circuitry enables conversion of direct human interaction with a surface (e.g. touching or pressing) into output voltage signals. In other embodiments the low voltage switch can combine several sensor signals 311a and 311b, perform one or more calculations using a computer processor in the low voltage switch 320 and generate one or more low voltage switch output signals 322. For example low voltage switch 320 can receive a direct sensor signal 311a when a user touches the multifunctional grille 214 and second sensor signal 311b from a motion sensor 269 when a person moves in front of the grille openings. Low voltage switch 320 can contain a processor that can combine direct sensor signals 311a and indirect sensor signals 311b and generate an output signal. In some embodiments the low voltage switch can perform timing calculations to determine when to generate an output signal. For example electrical switch assembly 100 can receive direct sensor signals 311a from the region 240a of the faceplate operable to turn off a light 115a. About the same time low voltage switch 320 and can receive indirect sensor input 311b indicating a person moving in the vicinity of the switch assembly 100. In response to 311a and 311b low voltage switch 320 can delay the transition of signal 322 to an OFF state by a few seconds in order to provide light while the person leaves the vicinity. In the context of this disclosure an ON state can be considered as having a voltage with a magnitude that is greater than a sizeable portion (e.g. >20%) of a power supply voltage (e.g. 5V) used to operate a low voltage switch 320. In the context of this disclosure an OFF state can be considered as having a voltage with a magnitude that is less than a sizeable portion (e.g. <20%) of a power supply voltage used to operate low voltage switch 320. The power supply voltage can be measured relative to a reference voltage supplied to the low voltage switch, often defined as a ground voltage or 0V. Low voltage switch 320 can include circuitry to operate one or more illumination components 330. Illumination components 330 can be LEDs or electroluminescent segments, incandescent bulbs or fluorescent bulbs. Illumination components 330 can be switch position indicator lights operable to indicate to a user the output state of one or more high voltage switches 323 or low voltage switch output signals 322.

In other embodiments electrical switch assembly can include one or more illumination components 330. Illumination components 330 can be operable to illuminate portions 130 of faceplate 105 and can be located on a circuit board located behind the front surface 212 of the faceplate. Connector 315 can also provide a junction for low voltage switch output signals 322d from a low voltage switch 320 to illumination components 330. Low voltage switch 320 can operate illumination components 330 (e.g. switch position indicator lights) in response to sensor signals. For example in response to a user touching a region of the faceplate, low voltage switch 320 can operate illumination components 330 to illuminate sections of the faceplate 130a and 130b indicating the present state of each of two dimmer switches. In another example a passive infrared sensor (PIR) could sense a person in the vicinity of electrical switch assembly 100 and signal low voltage switch 320 to illuminate regions 130a and 130b of the faceplate corresponding to the present value of low voltage switch output signals 322a and 322b (indicating the dimmer output to switch number 1 and ON-OFF position of switch number 2 respectively).

Low voltage switch output signals 322 are operable to control high voltage switches 323 and other aspects of the electrical switch assembly 100. Low voltage switch output signals 322 can be voltages in the range of minus 20 volts to plus 20 volts relative to ground in the junction box, the neutral wire or a local ground reference voltage supplied to both the low voltage switch 320 and the high voltage switch 323. In one implementation low voltage switch output signal 322a is a pulse width modulated signal (PWM) containing a series of pulses. Pulses contain two or more distinct voltage levels; a high state and a low state voltage. By varying the time proportions of high and low state voltage the PWM voltage waveform voltage switch output signal 322a can control the dimmer switch 323a. Other low voltage switch output signals 322b can operate electromechanical relays 323b. Signals 322b can supply a current to an electromagnet inside relay 323b, thereby creating a low resistance connection between wires 110b and 110d. In this context a connection with resistance <3 ohms can be considered a low resistance connection. Other low voltage switch output signals 322c can be transmitted to the speaker circuitry. FIG. 3 illustrates low voltage switch output signals 322c transmitted to the speaker processor 308. For example illumination components 330 can be used to indicate the volume of speaker 205 as an illuminated section 130a on faceplate 105. Grille 214 can additionally provide an active region 240d. In response to user interaction with 240d direct input sensors 330 can generate sensor signals 311a and cause low voltage switch 320 to signal speaker processor 308 to change the volume of the speaker. In another implementation low voltage switch output signal 322b operates a solid state relay, in which the moving parts of an electromagnetic relay are replaced with power transistors.

Electrical switch assembly 100 can contain a variety of other components and circuits. For example switch assembly 100 can contain a rectifier or diode rectifier to convert high voltages to low voltages, a battery to power the speaker or low voltage switches, particularly during a power outage to the building where the switch assembly is located. Electrical switch assembly 100 can contain one or more visual displays operable to be seen through faceplate 105. In some alternative embodiments amplifier 309 can be contained within speaker processor 308. In other embodiments speaker processor 308 and low voltage switch 320 can be combined in a general purpose processor that combines the ability to sense user input and generate sound signals using digital-to-analog conversion or pulse width modulation. An example of a processor that could combine the functionality of speaker processor 308 and low voltage switch 320 is the DSPic33 processor family from Microchip Incorporated. In one embodiment of electrical switch assembly 100, the functionality of one or more touch sensitive regions 240 can be determined by the present state of one or more low voltage switch output signals 322a or 322b. For example when a user walks into an room where the lights are OFF, low voltage electrical switch 320 can identify that one or more low voltage output signals 322 correspond to the light being in the OFF position and can interpret signals 311a from some or all touch regions 240 as indications to turn on the light. In this way the electrical switch assembly can identify direct user interaction and estimate the associated intent based on the output state of one or more electrical switches 323. When a person enters a dark room they often reach for the light switch and use the tactile feel of the switch as user feedback. In one example electrical switch assembly could devote sensor signals 311a from user interaction with some or all of the surface of the grille to the function of turning on a light in this scenario, thereby alleviating the user from the burden of touching a particular ON location (e.g. 240c). In this example an indirect input sensor (e.g., a light level detector) located behind the speaker grille could supply sensor signals 311b to a low voltage switch 320, indicating the light level in the room and enabling the low voltage switch to interpret sensor signals 311a from a larger number of direct user input sensors 310 as indication to operate a high voltage switch to turn on a light. In another example, indirect user input sensors 325 (e.g. a PIR sensor or proximity sensor) could sense a person who has entered a dark room and illuminate one or more regions 130 of faceplate 105. The indirect sensor can benefit from placement behind the grille 214 with a large density of openings 120 that enhance motion signal intensity. In one aspect the electrical switch assembly can illuminate features 130 with increasing intensity as person gets closer to the faceplate (e.g. as they reach for the switch), thereby avoiding unnecessarily disturbing a person who is moving in the vicinity of the electrical switch assembly and does not intend to operate an aspect of the assembly. Dynamic intensity variation can be controlled in part by sensing a person with a plurality of different sensing technologies. For example a faceplate can glow with a low intensity when a person is sensed on a long range PIR sensor (e.g. with 10 meter range). The faceplate can glow with a higher intensity if the person is subsequently sensed by a shorter range proximity sensor (e.g. active infrared transceiver).

Figure 4A:
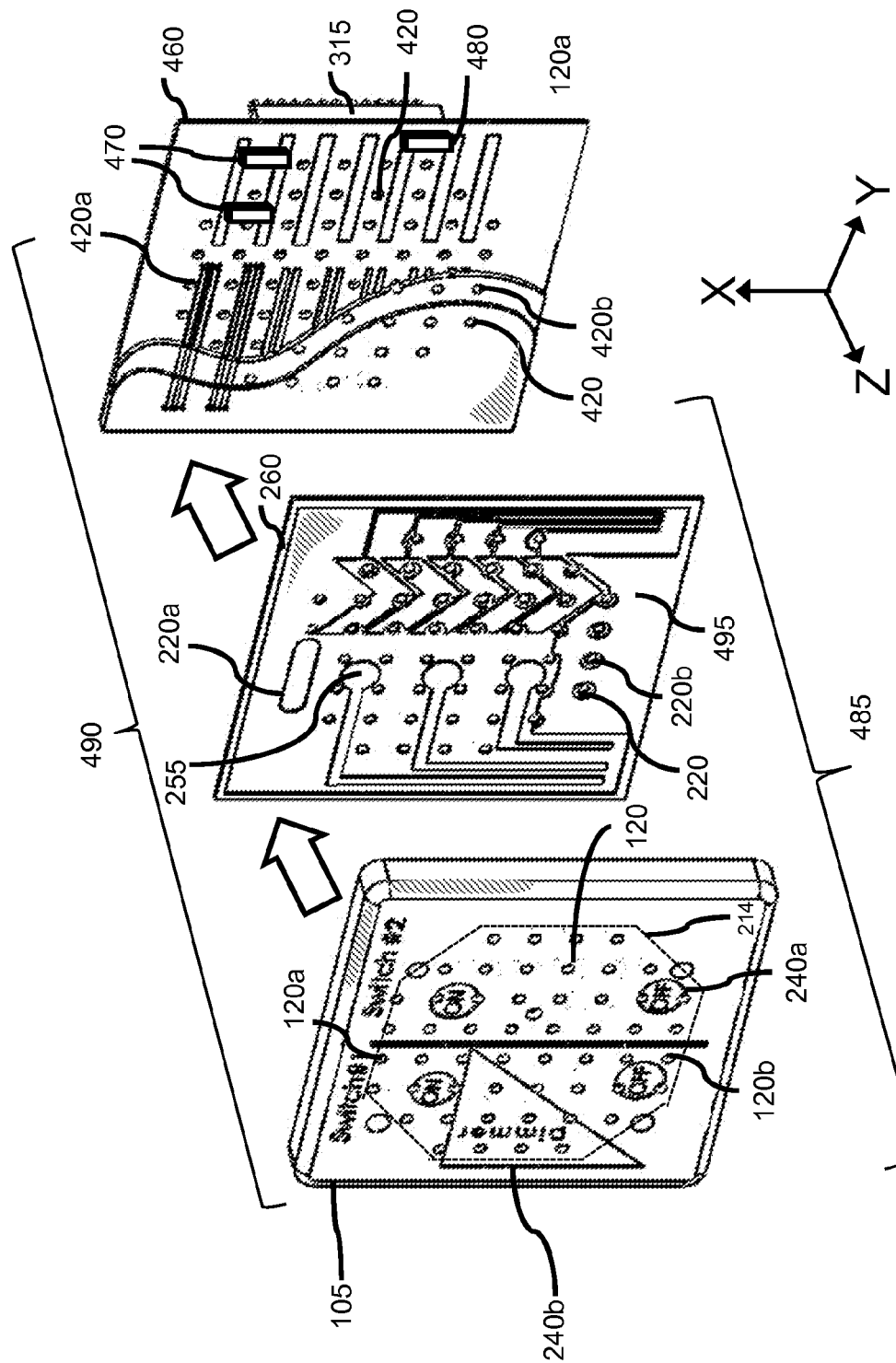
FIGS. 4A and 4B illustrates an exemplary front view of a faceplate with a touch sensitive speaker grille and two circuit boards in accordance with one embodiment of the present technology.

FIG. 4A illustrates several exemplary components of electrical switch assembly 100 designed to enhance audio performance while enabling electrical switch functionality in according with embodiments of this disclosure. Two circuit boards 260 and 460 are positioned behind the faceplate 105. Circuit board 260 contains a plurality of openings 220 and circuit board 460 contains a plurality of openings 420. It can be appreciate that the density and shape of openings in the grille 214 can be chosen to fulfill the competing goals of sound transmission and mechanical performance (e.g. electrical isolation and speaker protection). By choosing the size and shape of openings 220 so as not to cover openings 120 with substrate material 262 the sound transmission properties of the faceplate 105 can be preserved. In particular by aligning one or more openings 220 and 420 with the grille openings 120 the sound transmission performance becomes determined primarily by speaker grille 214. In the context of this disclosure an opening 220 can be considered to "align" with an opening 120 when the placement of 220 is such that the area of the unobstructed opening formed by the overlayed combination of 120 and 220 when viewed along an axis is at least half the area of the corresponding opening 120. For example 220a and 120a are considered aligned in FIG. 2A because when assembled the area of opening 120a and the area of the opening when 120a and 220a are in an assembled state is essentially equal. Opening 220a is made larger than 120a to ensure that any small misalignment of circuit board 260 and faceplate 105 following assembly does not cause 220a to impede sound transmission from speaker 205. In another example openings 120b and 220b and are considered aligned when the electrical switch is assembled. By aligning one or more openings in the faceplate 105 and circuit boards (e.g. 260 and 460) the present disclosure enables the circuit boards to add functionality to the grille while transmitting sound from the speaker. For example circuit boards 260 and 460 can provide mounting surfaces to hold touch sensor electrodes, indicator lights, and environmental sensors such as a temperature sensor 480. In one implementation a connector 315 is used to connect circuit board 460 to one or more low voltage switches 320. In the context of this disclosure the improved sound transmission as a result of aligning openings in the grille 214 and a circuit board can include, higher volume experienced in the region in front of the grille, decreased reverberation caused by reflected sound from grille 214 and the circuit board and improved audio clarity.

Circuit board 260 can be comprised of transparent conductors and a transparent substrate similar (e.g. clear plastic) to the touchscreens on tablet PCs. Transparent elements on circuit board 260 enable light illumination components 330 (e.g. light emitting diodes 470 and electroluminescent regions) on circuit board 460 to illuminate portions (e.g. sections 130) of the faceplate.

Figure 4B:
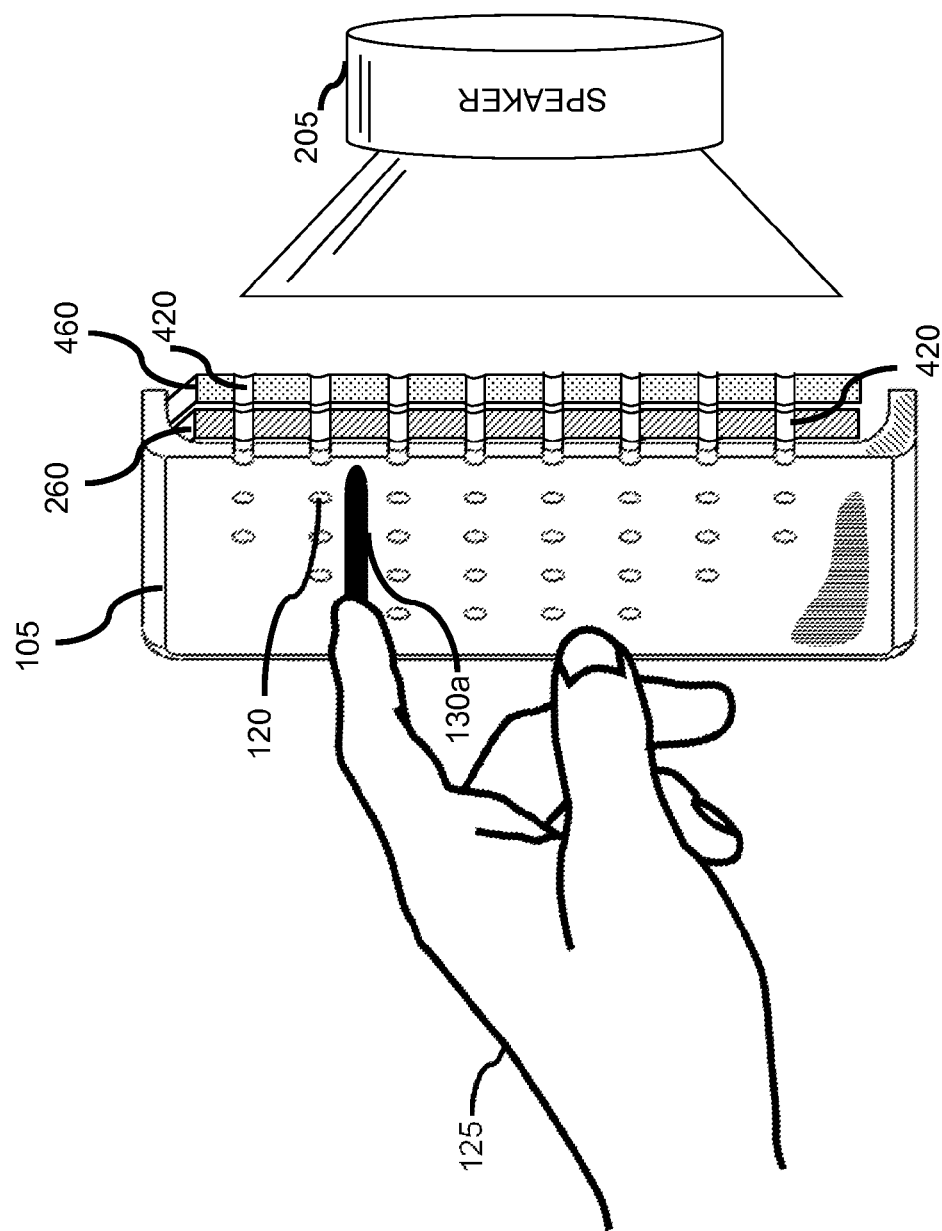

Conductive elements 255 can also be a transparent material such as indium tin oxide (ITO), antimony tin oxide or silver filled ink. In one implementation an interactive faceplate subassembly 485 is comprised of the faceplate 105 and circuit board 260. The interactive faceplate subassembly 485 can be attached to the other components of the electrical switch assembly by a user or installer. Interactive faceplate subassembly 485 enables the alignment of one or more openings 120 and openings 220 to be conducted in a controlled manufacturing environment. Interactive faceplate subassembly 485 further facilitates installation by enabling installation of other electrical switch assembly components (e.g., the speaker 205 and housing 210) into the junction box 215 prior to installation of the faceplate. This order of installation can help to avoid damaging sensitive sensor electrodes 255 in the interactive faceplate subassembly 485. In another implementation interactive faceplate subassembly 490 includes an additional circuit board 460 operable to illuminate features on the faceplate. Connector 315 can be disposed on a pigtail or a portion of flexible PCB designed to facilitate connection between the two halves of the connector. Connector 315 could be comprised of exposed connector electrodes at the end of a flexible PCB pigtail. Connector 315 can connect with a corresponding connector in the housing 210, for example a zero insertion force connector (ZIF) such as those sold by TE Connectivity from Harrisburg Pa. In other implementations interactive faceplate subassembly 490 has plurality of connectors similar to 315. Using more than one connector 315 provides redundancy in case a connector pin becomes dirty or damaged. One or more of the connectors can implement a safety interlock, thereby ensuring that portions of the electrical switch assembly 100 are not energized with high voltages until faceplate subassembly is properly secured and the connector 315 is correctly mated. In one embodiment interactive faceplate subassembly 490 has four connectors similar to 315, with one located at each corner of the faceplate to provide a means to both attach and provide power to subassembly 490. Interactive faceplate subassembly 490 has several additional advantages. The subassembly can be provided in a variety of colors, shapes and sizes to fit aspects of the wall opening and the user's preferences. Similarly, the size and pattern of grille member 214 can be varied as well as the color of illuminated sections 130. In contrast the portion of electrical switch assembly 100 inside the junction box 215 can be standardized and offer less customization. FIG. 4B illustrates a crossectional view of the speaker grille subassembly 490 including aligned openings. Speaker 205 is shown for reference.

FIG. 5A and FIG. 5B illustrate the basic operating principle of capacitive sensing. A number of standard technologies can be adapted to provide user input sensing in the presence of a large speaker 205 and pluralities of holes 120 220 and 420. These technologies include capacitive touch sensing (illustrated in FIGS. 5A and 5B), and resistive touch sensing, surface acoustic wave touch sensing and load sensing. A finger 505 is placed over a layer of insulating material 510. A target electrode 515 is disposed behind layer 510. Electrode 515 has a background capacitive coupling to a ground electrode similar to 495. When a finger or other object directly interacts with the top surface of layer 510 the capacitance 525 is often increased. The increase in capacitance causes a temporary current to flow in a conductor such as 254 connecting the sensor electrode 255 to a low voltage switch 320. This current constitutes a direct sensor signal 311a. FIG. 5B also illustrates an advantage of the present design. When a finger touches a conventional capacitive touch sensor, over a target electrode 515, as illustrated in FIG. 5A there is an unintended signal generated at a neighboring electrode 530. It is desirable to reduce this cross-capacitance signal 535a and 535b. FIG. 5B illustrates a capacitive touch sensor in accordance with one implementation of this disclosure. There is an opening 540 in the insulating layer 510 between the target and neighboring electrodes. This opening can be opening 120 in the grille 214. This opening reduces the cross capacitance 535b between the finger 505 and the neighboring electrode 530. By reducing the undesirable cross-capacitance from 535a to 535b the present disclosure enables electrodes 515 and 530 to sense more accurately or be placed closer together. In the present disclosure a plurality of holes 120 in the faceplate 105 can cross-capacitance (C2<C1), thereby enabling improved special resolution of touch identification. Yet another advantage of the present assembly is illustrated in FIG. 5C whereby the target capacitance 530 can be increased by extending target electrode 515 at least some of the way into opening 540. The extended section is illustrates as the shaded portion 517 of the target electrode in FIG. 5C. One way to implement this electrode extension is to increase the plating thickness of electrode 515 close to opening 540. Electrode 515 and 530 are examples of direct user input sensors 310.

FIG. 6 illustrates an exemplary electrode array designed to enable a touch sensitive speaker grille in accordance with one implementation of this disclosure. A variety of sensor electrodes including 255, 605a and 605b are patterned on insulating substrate 262. Sensor electrodes are operable to sense direct user interaction with a variety of regions 240 of faceplate 105. The exact layout of sensor electrodes and regions 240 will vary from one implementation to another. Electrode 255 is a discrete sensor electrode designed to identify direct user interaction with a binary input region of the speaker grille. 605a and 605b are electrodes designed to nest within one another such that a user's finger is sensed by 2 or more electrodes at most times. Region 610 includes 5 nested electrodes and is used to implement a slider touch function. When a user slides their finger up or down within the dimmer region 240b of the faceplate 105 and grille 214, multiple electrodes in the touch slider electrode region 610 sense the direct user input and send sensor signals 311a to the low voltage switch 320. The low voltage switch can interpolate the sensor signals and estimate the placement of the user's finger on the touch sensitive region of the faceplate and grille. Circuit board 260 includes a ground electrode 495 that acts as a reference for the other electrodes. Circuit board 260 has a plurality of openings 220 places in accordance with aspects of this disclosure so as to enhance sound transmission. The size and location of openings 220 are chosen to align with openings 120. Conductors and electrodes can be routed around openings 220 as illustrated at 625. In some cases one electrode can be connected to multiple conductors 254. The conductors can be routed in different paths around openings 220 to account for the presence of plurality of openings 220. A person of skill in the art would appreciate that a dense plurality of openings can be placed on substrate 260 and modern circuit board layout software is well suited to routing conductors and electrodes within the small portion of solid substrate 262 that can remain. Openings 420 and 220 can have a guard ring 630 around the opening, whereby the guard ring is a ring around the opening without electrode material (e.g. copper foil). Guard ring 630 can ensure that a user cannot see or touch the edge of an electrode.

FIG. 7 illustrates an exemplary circuit board 460 designed to illuminate regions 130 of the faceplate 105. Light can be generated on circuit board 460 using a variety of technologies including light emitting diodes (LEDs) or electroluminescenc (EL). In the embodiment illustrated in FIG. 7 two emitting diodes 470 are electrically connected between two conductors 254a and 254b. Light emitting diodes 470 can be electrically connected to circuit board 460 while enabling a plurality of openings 420 to align with openings 120 in grille 214. In this manner the LEDs can be used to illuminate sections of the faceplate 105 while the circuit board 460 does not diminish the sound transmission performance of the electrical switch assembly.

Section 710 of circuit board encloses a region operable to produce illumination by a process of electroluminescence. Electroluminescent materials light up when current passes through them. A variety of electroluminescent paint kits are available for circuit board applications, for example the Luxprint® Electroluminescent products from Dupont. Conductors 254c are deposited on substrate 460 to define the shape of the electroluminescent region. Conductors 254c can have close proximity (e.g. 100 micrometers) thereby enabling intricate conductor shapes to be illuminated. A dielectric layer 725 covers the conductors 254c. The dielectric layer has a high electrical resistance relative to the underlying conductor 254c. Dielectric layer 725 can comprise a high dielectric constant material such as barium titanate. The dielectric layer can alternatively be a solder mask material deposited on the circuit board 460. An electroluminescent material 730 covers the dielectric layer. Common electroluminescent materials include phosphor and zinc sulfide. One or more top electrodes 740 covers the electroluminescent layer 730. In this embodiment the top electrode is a transparent electrode such as ITO on a clear plastic film. Alternating voltage applied to electrodes 740 and 254c causes the overlapping regions of the electrodes 740 and 254c to be illuminated. In some embodiments electrode 740 is large and covers a substantial portion of the circuit board 460. The electroluminescent region 710 can be particularly useful for providing a user with visual feedback regarding the state of one or more analog 322a outputs from a low voltage switch 320. For example region 710 can illuminate a dimmer switch position on the faceplate, thereby guiding the user's finger to touch the region of the faceplate corresponding to the present dimmer location and raise or lower the light level by dragging their finger to a new location. Conductors 254c can be closely spaced and can be energized in sequence as the user moves their finger on the faceplate, thereby tracking the user's finger with illumination from the original dimmer position to the new dimmer level. Electroluminescence can produce complex light patterns, based on the shape of conductors 254c. Electroluminescent illuminated regions 710 produce enhanced line edge definition in comparison to LED technology. Conductors 254c can be patterned so as to circumvent the openings 420. In this manner the electroluminescent region 710 can be used to illuminate sections of the faceplate 105 while the circuit board 460 and openings 420 enhance the sound transmission performance of the speaker 205.

FIGS. 8A and 8B illustrate two additional embodiments of the faceplate 105 of electrical switch assembly 100. In FIG. 8A molded features on the faceplate can indicate touch sensitive areas of faceplate 105. The raised areas can occupy a large portion of the faceplate.

The size and shape of openings 120 can be designed to enhance sound performance and switch functionality. In FIG. 8B a plurality of vertical slots 815a are disposed in a touch sensitive faceplate 105. The openings 815a can be designed to produce a characteristic sound and sequence of direct user input sensor signals 311a electrode when a user moves their finger in a vertical manner on the dimmer section of the touch sensitive faceplate 105. In another example, a pattern of horizontal slots 815b can be arranged to cover a sensor disposed behind the grille (e.g. a passive infrared sensor 269). In this case the openings can be optimized to provide more openings with less space between openings in order to enhance sensitivity of PIR 269 to motion.

FIG. 9 illustrates an exemplary rear view of a faceplate with a touch sensitive speaker grille in accordance with one embodiment of the present technology. In this embodiment electrodes 255 and conductors 254 are deposited directly onto the rear surface of the faceplate 105. Electrodes 255 and conductor 254 can be deposited using a variety of technologies including conductive ink or laser direct structuring LDS or selective plating. Electrodes 255 and conductors 254 are deposited on an interior surface 910 of faceplate 105. Surface 910 contains a plurality of openings 920a and 920b that align with openings 120a and 120b in the front surface of the faceplate, and thereby enhance sound transmission from a speaker that can be placed behind faceplate 105. An electronic component (e.g. an LED, thermistor or resistor) is attached to the faceplate and electrically connected to conductors 954a and 954b. This implementation enables one or more electronic components to be disposed on the rear surface of the faceplate while not impeding sound transmission from the speaker 205. One or more electronic components 930 could be used with electrodes 255 to implement an indicator light that is locally controlled by signals 311a generated at touch electrodes 255 and do not need to be processed by low voltage 320 in order to generate illumination control signals. Another advantage of the implementation illustrated in FIG. 9 is that alignment of the openings 120 in the faceplate and openings 920 in touch electrode substrate can be enabled by a single molding operation. In particular, the step of aligning a separate substrate (e.g., 260 in FIG. 2) is eliminated. Direct structuring technologies such as LDS are well suited to routing narrow (<100 micrometer) conductors 254 around a plurality of closely spaced openings 920.

Other Embodiments

FIG. 10 illustrates an interactive speaker grille in accordance with several aspects of the present disclosure. Interactive speaker grille 1005 is designed to transmit sound from a speaker 205, and contains portions that are touch sensitive and operable to illuminate distinct features on the speaker grille. Interactive grille 1005 comprises a faceplate 105 and three circuit boards 260, 1060 and 460 located behind the faceplate and in front of speaker 205.

Sound transmission is enhanced by aligning a plurality of openings on faceplate 105 and circuit boards 260, 460 and 1060. Faceplate 105 has a plurality of openings 120 that form a speaker grille 214. When assembled, opening 120a aligns with openings 220a 1020a and 420a and thereby promotes sound transmission from speaker 205 to the area in front of faceplate 105. It can be appreciated that a large number of the openings comprising speaker grille 214 can be aligned with similar openings on one or more circuit boards to promote sound transmission. The speaker grille 214 contains a plurality of regions 240 in which direct user interaction (e.g., touching or pressing) can be sensed by a plurality of electrodes 255 and 605 disposed behind faceplate. FIG. 10 illustrate four exemplary regions 240a, 240b, 240c and 240d wherein direct user input is operable to be sensed by one or more sensor electrodes 255, 605a and 605b on circuit board 260. For example direct use interaction (e.g., touching or pressing) with region 240c causes sensor electrode 255 to generate direct user input signals 311a. In another example region 240b of the faceplate 105 can function to as analog switch. The placement position of a user's finger within region 240b indicates a desired user input value to a low voltage switch 320 within a range of switch values (e.g. from 0 to 100). Region 240d is an example of a multipurpose touch sensitive region of speaker grille 214. Area 240d can to control a variety of functions in a speaker application for example changing the volume, selecting a song, playing or pausing music or selecting an input source. The function of region 240d can be based in part the prior sequence of regions 240 that the user has interacted with. Illuminated sections of the faceplate, for example 130c) can indicate the present functionality of region 240d. Circuit board 260 contains a plurality of electrodes 255, and 605b operable to sense direct user interaction with speaker grille 214. Electrodes 254 carry direct sensor signals 311a to a low voltage switch 320. Electrodes 254 are routed around the plurality of openings 220.

Sections of the interactive grille 1005 can be illuminated by light generating components 470 (e.g. LEDs or organic LED) or electroluminescent sections 710 (illustrated in FIG. 7). Light generating components 470 and electroluminescent sections 710 can be placed on a circuit board 260 with touch electrodes or can be placed on additional circuit boards behind the touch sensor electrodes 255 and 605b. FIG. 10 illustrates an LED 470 on circuit board 460 and an electroluminescent section (shown as 710 on FIG. 7). The electroluminescent section 710 contains the electrodes 254c, dielectric layer 725 and electroluminescent layer 730 described previously in this disclosure. In the implementation of FIG. 10 the top electrode 740 is replaced by a plurality of electrodes 1010 disposed on a third circuit board 1060. This arrangement enables horizontal electrodes 254c and vertical electrode 1010 to be operated by signals 322d (illustrated in FIG. 3) from a low voltage switch 320 and thereby generate an illuminated region 130c on faceplate 105. Pixel 130c on faceplate 105 is above the region where the two electrodes cross. It can be appreciated that similar pixels of light can be generated at a large number of locations where a horizontal and vertical electrode pass over one another. It can be appreciated that the pixels can be disposed around the plurality of openings 120 and can form a variety of patterns operable to convey information to a user. In one implementation multiple illuminated pixels such as 130c can display the function of a multipurpose active region 240d for example displaying the volume of the speaker. In another example an array of pixels 1030 can display an equalizer, indicating the sound volume of particular frequency bands (e.g. 1000-2000 Hz). Such equalizer displays are common on multispeaker music systems such as the Kenwood GE 100 and provide an aesthetic appealing graphical display for the user. A plurality illuminated regions 130c can also generate patterns operable to change shape or intensity in time with the beat of a song. It would be understood by a person of skill in the art that an array of pixels capable of illuminating individual portions of the speaker grille 214, disposed around a plurality of openings 420a and 420b can also be implemented by a plurality of discrete light emitting light elements 470, such as LEDs, organic LEDs, incandescent lamps or fluorescent lamps.

Electrodes 1010 can be made from a transparent material (e.g. indium tin oxide (ITO), antimony tin oxide (ATO) or silver ink) and thereby enhance light transmission from electroluminescent layer 730 or discrete illumination devices 705. In FIG. 10 direct sensor signals 311a are transmitted to low voltage switch 320. Low voltage switch output signals 322d can be transmitted to electrodes 254a and 254b to control illumination of light emitting elements 470. Light emitting elements 470 are examples of illumination components 330 in FIG. 3. Other low voltage switch output signals 322d can be transmitted to electrodes 254c and 1010 to control illumination of some or all of electroluminescent region 710 (illustrated in FIG. 7). In general a large number of low voltage switch output signals 322d can be used to operate a plurality of illuminated components 330 (e.g. discrete light emitting elements 470 or electroluminescent region 710) disposed around a plurality of sound transmitting openings 420a and 420b, thereby illuminating sections 130 of speaker grille 214. Direct sensor signals 311a can also be used by low voltage switch 320 to generate low voltage switch outputs 322c operable to control aspects of a speaker processor 308. For example a user's finger can touch region 240b of the interactive speaker grille and cause sensors in slider region 610 (illustrated in FIG. 6) to send signals 311 to low voltage switch 320. The switch can in turn use signals 311a to generate low voltage switch output 322c indicative of the position of the user's finger on the volume slider portion of the faceplate. Speaker processor 308 can use signals 322c to control the magnitude of signals 316 to the speaker 205. In one aspect of the present disclosure, low voltage switch 320 can also produce outputs 322d operable to control illumination of the section of the faceplate behind 240d thereby indicating to the user the volume control value. In FIG. 10 circuit board 260 and 1060 can be transparent and contain transparent conductors so as to facilitate illumination of distinct portions of the faceplate by illumination components 705 and 710 on circuit board 460.

Interactive speaker grille 1005 can enable touch sensitive and illuminated regions of the speaker grille using one or more circuit boards disposed behind the grille have one or more openings that align with the openings forming the grille. FIG. 10 illustrates three circuit boards 260, 460 and 1060 in part to illustrate the arrangement of components (e.g. LEDs and electrodes) on individual substrates. It can be appreciated the same touch sensing and illumination functionalities can be accomplished by combining the individual circuit boards 260, 460 and 1060 into a variety of multiple-layer circuit boards. For example circuit boards 260 and 1060 can be two separate transparent circuit boards or can be combined into one transparent circuit board with touch electrodes 605a and 255 disposed on the surface facing the interactive grille 214 and illumination electrodes 1010 disposed on the rear surface facing circuit board 460. Electroluminescent region 710 can require intimate contact between electrodes 1010 and the electroluminescent (e.g., phosphor) layer 730. This contact can be accomplished by bonding circuit board 1060 to board 460 in a manner similar to touch sensitive display fabrication. One or more connectors similar to 315 can connect circuit boards 260, 460 and 1060. A connector can also be used to connect circuit boards (e.g. 260 or 460) to another circuit board positioned behind the X-Y plane formed by the flange 206 of the speaker 205. Electrodes on boards 260, 460 and 1060 can also be connected using wires and solder contacts. The interactive speaker grille 1005 enables a large area of the speaker grille 214 to be functionalized as a control surface and a display surface. In one aspect the speaker grille 214 can be made from an electrically insulating material, thereby enabling the interactive speaker grille to identify user interaction with multiple distinct regions of the grille. A dense plurality of openings 120 can facilitate effect sound transmission. Interactive speaker grille 1005 can devote a large region (e.g. region 240d) to speaker controls. As wireless speakers have become more compact the surface area devoted to user controls has decreased. In contrast interactive speaker grille 1005 could devote the whole grille area to controls such as radio station selection, play, pause or skip to the next song. The touch sensitive capability and the illumination functionality can be combined to implement an interactive control.

For example many of the speakers on the market do not have enough available area to provide a volume slider and therefore require the user to press a volume button multiple times to increment or decrement volume. This repeated button pushing is tedious and the user is often left without a visual indication of the volume level. Illumination components 330 and low voltage output signals 322c can instead produce a visual pattern of illuminated sections 130c on the interactive speaker grille that effectively indicate the present volume level. A user can use a corresponding touch sensitive region (e.g. 240c or 240d) to initiate volume change. Touch functionality and illuminated components can be implemented on circuit boards with a dense plurality of openings arranged so as to enable sound impedance of the interactive speaker grille 1005 in FIG. 10 is determined primarily by the sound impedance of the grille member 214.

In another embodiment electrical switch assembly 100 can be used to replace the functionality of a mechanical object (e.g., mechanical toggle switch) with which a user associates a characteristic sound (e.g., the "click" sound associated with a light switch or the chime associated with a doorbell). A speaker 205 disposed behind the touch sensitive speaker grille can produce the sound familiar to the user. This embodiment has the advantage that the user receives the sound from the area that is touches (i.e. the speaker grille) and not from another area away from the touch sensitive surface, which would have the potential to confuse a user. For example the electrical switch assembly 100 could produce a familiar click sound when a user touches an area of the grille operable to control an electrical switch. In another example the touch sensitive speaker grille could be used to guide a person towards a touch sensitive surface with audio feedback. For example a person with visual impairment could follow sound emanating from the touch sensitive speaker grille in order find the touch sensitive surface operable to control aspects of the speaker or electrical switches. The sound could vary to indicate that the user if getting closer or further from the interactive speaker grille.

OPERATION

FIG. 12-15

FIG. 12 is a block diagram illustrating the operation an electrical switch assembly with audio capability in accordance with one embodiment of the present technology. At block 1210 the speaker 205 receives audio signals 316 from amplifier 309. At block 1220 speaker 205 emits sound waves through a pattern of openings in the speaker grille 214 and an aligned pattern of openings in one or more circuit boards (e.g., openings 220 in circuit board 260). At block 1230 a user touches a region of the speaker grille portion 214 of the faceplate 105, wherein the region is operable to be sensed by electrodes on circuit board 260 or functionalized surface 910 disposed behind the front surface of the faceplate. At block 1230 electrodes (e.g. 255, 605a and 605b) generate direct sensor signals 311a. At block 1240 sensor signals 311a are received by one or more low voltage switches 320. At block 1240 the low voltage switch processes the signals; determine if the signals meet specific criteria (e.g. touch location, duration, sequence). At block 1250 electrical switch assembly 100 generates one or more low voltage switch output signals 322 and transmits these signals to one or more high voltage switches (e g dimmer 323a or relay 323b). At block 1260 one or more high voltage switches 323 operate to control the connection between one or more pairs building-based electrical wires. This operating sequence enables the functionality of a traditional electrical switch to be replicated using a combination of a low voltage switch and a high voltage switch, while devoting the space traditionally occupied by the mechanical switch to a large speaker centrally disposed in the switch housing and operable to project sound waves through a touch sensitive speaker grille.

FIG. 13 is a block diagram illustrating additional steps involved in the operation of some alternative embodiments of the electrical switch assembly.

At block 1305 electrical switch assembly can receive wireless signals 135 from a variety of wireless sources 140. System 100 can use a wireless receiver 306, speaker processor 308 and amplifier 309 to generate audio signals 316. At block 1325 electrical switch assembly 100 can illuminate regions of the speaker grille using illumination components 330 disposed on a circuit board designed with a plurality of aligned openings, wherein the opening promote sound transmission. At block 1327 electrical switch assembly 100 can optionally guide the user to an active region of the speaker grille using one or more illuminated regions 130. At block 1345 illumination components 330 can be controlled using low voltage switch output signals 322*d* from the low voltage switch processor 320.

FIG. 14 is a block diagram illustrating the operation an interactive speaker grille 1005 in accordance with one embodiment of the present technology. At block 1410 the speaker 205 receives audio signals 316 from amplifier 309. At block 1420 speaker 205 emits sound waves through a plurality of openings in the speaker grille 214 and an aligned plurality of openings in one or more circuit boards (e.g., openings 220 in circuit board 260). At block 1425 interactive speaker grille 1005 can illuminate regions of the speaker grille using illumination components 330 disposed on a circuit board designed with a plurality of aligned openings, wherein the openings promote sound transmission. At block 1430 a user touches a region of the speaker grille 214, wherein the region is operable to be sensed by direct user input sensors 310 (e.g. sensor electrode 255) on circuit board 260 or functionalized surface 910 disposed behind the front surface of the faceplate. At block 1427 interactive speaker grille 1005 can optionally guide the user to an active region of the speaker grille using one or more illuminated regions 130. At block 1430 electrodes (e.g. 255, 605*a* and 605*b*) generate direct sensor signals 311*a*. At block 1440 sensor signals 311*a* are received by one or more low voltage switches 320. At block 1440 the low voltage switch processes the signals; determine if the signals meet specific criteria (e.g. touch location, duration, sequence). At block 1445 illumination components 330 can be controlled using low voltage switch output signals 322*d* from the low voltage switch processor 320. At block 1450 a low voltage switch 320 generates one or more low voltage switch output signals 322*c* and transmits these signals to a speaker processor 308. At bock 1460 speaker processor 308 controls an aspect of audio signals 316 sent to speaker 205.

FIG. 15 is a block diagram outlining the operations associated with integrating audio capability into an electrical switch assembly 100 in accordance with several aspect of the present disclosure. At block 1510 the integration can involve providing a housing 210 including a forward facing portion 217. At block 1520 the integration can involve providing a speaker 205 disposed inside the housing. At block 1530 the integration can involve providing a faceplate operable to be attached to the housing and to cover the speaker. At block 1540 the integration can involve providing a grille portion of the faceplate having a first plurality of openings for sound generated by the speaker to be transmitted to the region in front of the assembly. At block 1550 the integration can involve providing one or more sensors disposed behind the forward facing surface of the faceplate and operable to sense direct user interaction with one or more regions of the forward facing surface of the faceplate. At block 1560 the integration can involve incorporating a second plurality of openings into the sensor substrate. At block 1570 the integration can involve aligning at least one of the openings in the first and second plurality, so as to promote improved sound transmission through the sensor substrate. At block 1580 the integration can involve providing a low voltage switch operable to process direct sensor signals from one or more of the sensors. At block 1580 the integration can involve providing sensor placement such that one or more of the sensors are operable to sense direct user interaction with the grille portion of the faceplate.

The invention claimed is:

1. A building-based electrical switch assembly with audio capability comprising:
    a housing including a forward facing portion and containing two or more electrical terminals, each operable to connect to one or more wires installed in a building;
    a speaker disposed inside the housing;
    one or more direct user input sensors operable to sense direct input from a user and operable to generate direct sensor signals;
    one or more low-voltage switches operable to generate one or more low voltage switch output signals, wherein at least one of the low voltage switch output signals is based at least in part on direct sensor signals; and
    a faceplate located in front of the forward facing portion of the housing comprising:
        a speaker grille having a plurality of openings wherein the speaker grille substantially protects the speaker, enables sound transmission from the speaker and provides for physical separation between the user and the internal components of the electrical switch; and
        one or more regions of the front surface of the faceplate wherein direct user interaction is sensed by the one or more of the sensors, and wherein the one or more regions includes at least a portion of the speaker grille.

2. The electrical switch assembly of claim 1 further comprising:
    one or more printed circuit boards disposed behind the front surface of the faceplate and having a portion covering the forward facing surface of the speaker cone,
    wherein the one or more printed circuit boards contains a second plurality of openings,
    wherein at least one of the openings in the second plurality align with an opening in the first plurality of openings, thereby improving sound transmission from the electrical switch assembly, and
    wherein at least one of the direct user input sensors is located on the portion of at least one or more circuit boards that covers the speaker cone.

3. The electrical switch assembly of claim 2 further comprising:
    one or more illumination components disposed on at least one of the printed circuit boards;
    wherein the one or more illumination components are operable to indicate the output state of at least one low voltage electrical switch by illuminating one or more second regions of the faceplate, and
    wherein the one or more second regions includes at least a portion of the speaker grille.

4. The electrical switch assembly of claim 1 wherein in the assembled state the number of openings from the first plurality of openings that align with openings from the second plurality of openings, is at least 50.

5. The electrical switch assembly of claim 1 further comprising one or more high voltage switches operable to receive low voltage switch output signals and operable to make a low resistance electrical connection between two or more conductors operable connected to the one or more high voltage switches.

6. The electrical switch assembly of claim 1 wherein the grille and faceplate are formed from a continuous piece of material and wherein the faceplate is comprised of one or more non-metallic electrically insulating materials from a set of materials including: plastic, glass, glass-filled plastic or ceramic.

7. The electrical switch assembly of claim 1 wherein a first non-zero subset of the direct user input sensors is operable to sense user interaction with a first region of the speaker grille and wherein a second non-zero subset of the direct user interaction sensors are operable to sense user interaction with a second region of the speaker grille and wherein the user interaction sensors in the first subset and second subset are mutually exclusive.

8. The electrical switch assembly of claim 1 wherein the grille occupies the majority of front surface of the faceplate.

9. The electrical switch assembly of claim 1 wherein the one or more of the low-voltage switches operate an aspect of the speaker.

10. The electrical switch assembly of claim 1 further comprising a microphone, whereby the microphone is placed behind the grille.

11. The electrical switch assembly of claim 1 wherein the means of direct user input sensing includes one or more load sensors attached to the faceplate.

12. The electrical switch assembly of claim 1 wherein the system further comprises one or more electrical connectors operable to make a plurality of electrical connections between the faceplate and elements of the electrical switch assembly located in the housing.

13. The electrical switch assembly of claim 1 wherein the direct user input sensors are based on a technology from a set of technologies including: Capacitive touch sensing, resistive touch sensing, acoustic touch sensing, weighting sensing and load sensing.

14. The electrical switch assembly of claim 1 further comprising:
one or more indirect input sensors operable to sense an aspect of the environment in the vicinity of the electrical switch and wherein the indirect sensor is disposed inside the housing behind the grille and wherein the openings in the grille facilitate the indirect input sensor to sense in a region in front of the faceplate.

15. A method of integrating audio capability into an electrical switch assembly comprising:
providing a housing including a forward facing portion;
providing a speaker disposed inside in the housing;
providing a faceplate, operable to be attached to the housing and to cover the speaker, wherein the faceplate includes a front surface;
providing a grille portion of the faceplate having a first plurality of openings for sound generated by the speaker to be transmitted to the region surrounding the electrical switch assembly;
providing one or more direct user input sensors disposed behind the front surface of the faceplate and operable to sense direct user interaction with one or more regions of the front surface of the faceplate;
wherein the one or more sensors are disposed on a surface with a second plurality of openings, and
wherein at least one of the openings in the second plurality of openings aligns with one or more of the openings in the first plurality of openings, thereby promoting improved sound transmission from the speaker;
wherein one or more of the direct user input sensors are operable to send signals to one or more low-voltage switches, and
wherein at least one of the direct user input sensors is operable to sense direct user interaction with at least a portion of the speaker grille.

16. The method of claim 15 further comprising:
operating one or more high voltage electrical switches based on low voltage switch output signals received from the low voltage switches, wherein the one or more high voltage electrical switches are operable to make a low resistance connection between two or more wires installed in a building and wherein the one or more low voltage electrical switches are disposed in the housing.

17. The method of claim 15 wherein the speaker grille is comprised of one or more non-metallic electrically insulating material from a set of materials including: Plastic, Glass, glass-filled plastic, or ceramic.

18. The method of claim 15 wherein the sensors are based on a technology from a set of technologies including: capacitive touch sensing, resistive touch sensing, acoustic touch sensing, weighting sensing and load sensing.

19. An electrical switch assembly with integrated audio capability comprising:
a housing operable to be located in an electrical junction box;
a speaker placed inside the housing, such that the speaker is centrally located in the housing;
an interactive faceplate subassembly covering the housing, operable to provide electrical isolation between a user and high voltage elements inside an electrical junction box, the faceplate comprising:
a portion containing a first plurality of openings forming a speaker grille located in front of the speaker;
one or more direct user input sensors operable to generate sensor signals based on direct user interaction with the faceplate;
wherein the one or more direct user input sensors are disposed behind the front surface of the faceplate on a surface with a second plurality of openings, and wherein at least one of the openings in the second plurality of openings aligns with one or more of the openings in the first plurality, thereby promoting improved sound transmission from the speaker;
one or more regions on the front surface of the faceplate wherein direct user interaction is sensed by the one or more of the direct user input sensors, and wherein the one or more regions includes at least a portion of the speaker grille; and
one or more low voltages switches operable to receive direct sensor signals from the one or more direct sensor elements and generate one or more low voltage switch output signals, based at least in part on received sensor signals.

20. The electrical switch assembly of claim 19 wherein the direct user input sensor elements are located on an electrical circuit boards located behind the front surface of the faceplate and wherein the circuit board contains the second plurality of opening.

21. The electrical switch assembly of claim 19 wherein the direct user input sensors are based on a technology from a set of technologies including: capacitive touch sensing, resistive touch sensing, acoustic touch sensing, weighting sensing and load sensing.

22. The electrical switch assembly of claim 19 wherein the sensor elements are deposited to an interior surface of the grille portion of the faceplate using a technology from a set of technologies including: screen printing, molded interconnect device technology, laser direct structuring, inkjet printing, sputtering and electroplating.

* * * * *